US010303668B2

(12) United States Patent
Koseki et al.

(10) Patent No.: US 10,303,668 B2
(45) Date of Patent: May 28, 2019

(54) AUTOMATIC SCREEN GENERATION DEVICE, AUTOMATIC SCREEN GENERATION PROGRAM, AND AUTOMATIC SCREEN GENERATION METHOD

(71) Applicant: HOIPOI CO., LTD., Yokohama-shi, Kanagawa (JP)

(72) Inventors: Yusuke Koseki, Yokohama (JP); Motoko Suzuki, Yokohama (JP)

(73) Assignee: HOIPOI CO., LTD., Yokohama-Shi (JP)

( * ) Notice: Subject to any disclaimer, the term of this patent is extended or adjusted under 35 U.S.C. 154(b) by 656 days.

(21) Appl. No.: 14/893,587

(22) PCT Filed: Aug. 11, 2014

(86) PCT No.: PCT/JP2014/071250
§ 371 (c)(1),
(2) Date: Nov. 24, 2015

(87) PCT Pub. No.: WO2015/022951
PCT Pub. Date: Feb. 19, 2015

(65) Prior Publication Data
US 2016/0125001 A1    May 5, 2016

(30) Foreign Application Priority Data

Aug. 13, 2013 (JP) ................................ 2013-168081

(51) Int. Cl.
*G06F 16/00* (2019.01)
*G06F 16/22* (2019.01)
(Continued)

(52) U.S. Cl.
CPC ............... *G06F 16/22* (2019.01); *G06F 8/38* (2013.01); *G06F 16/217* (2019.01); *G06F 16/26* (2019.01);
(Continued)

(58) Field of Classification Search
CPC ........................ G06F 17/30312; G06F 16/22
(Continued)

(56) References Cited

U.S. PATENT DOCUMENTS 6,182,142 B1 *   1/2001  Win ...................... G06F 21/604
                                            709/219
2005/0114361 A1 * 5/2005  Roberts ..................... G06F 8/38
2007/0162857 A1 * 7/2007  Weber ....................... G06F 8/30
                                            715/731

FOREIGN PATENT DOCUMENTS

JP        06-068151        3/1994
JP        2000-20295       1/2000
JP        2012-98878       5/2012

OTHER PUBLICATIONS

International Search Report for PCT/JP2014/071250 dated Sep. 16, 2014, four pages.

* cited by examiner

*Primary Examiner* — Chelcie L Daye
(74) *Attorney, Agent, or Firm* — Nixon & Vanderhye PC

(57) ABSTRACT

According to a conventional method, there is only one kind of a database access screen pattern (single sheet format), the screen layout cannot be changed from one user to another, a portion that produces an output to a database needs to make an external program call, and, there is no user-by-user utilization right which is generally required for a database access screen, not is there a function provided for transitioning from database access screen A to database access screen B involving value transfer. The present invention is
(Continued)

provided with two kinds of screen patterns of a single sheet format and a list format, eliminates the need for a programming language and a database operation language, and is further provided with user-by-user utilization right and a function for transitioning from data access screen A to data access screen involving value transfer on the basis of a setting made by a setting person without requiring programming. Further, in accordance with a setting content by the setting person is stored, and a database access screen corresponding to a utilization mode is automatically generated in accordance with the setting content selected by the user and a screen program.

12 Claims, 15 Drawing Sheets

(51) Int. Cl.
*G06F 16/21* (2019.01)
*G06F 8/38* (2018.01)
*G06F 17/30* (2006.01)
*G06F 16/26* (2019.01)

(52) U.S. Cl.
CPC .. *G06F 17/30306* (2013.01); *G06F 17/30312* (2013.01)

(58) Field of Classification Search
USPC .......................................................... 707/741
See application file for complete search history.

Fig. 1  Functional block diagram
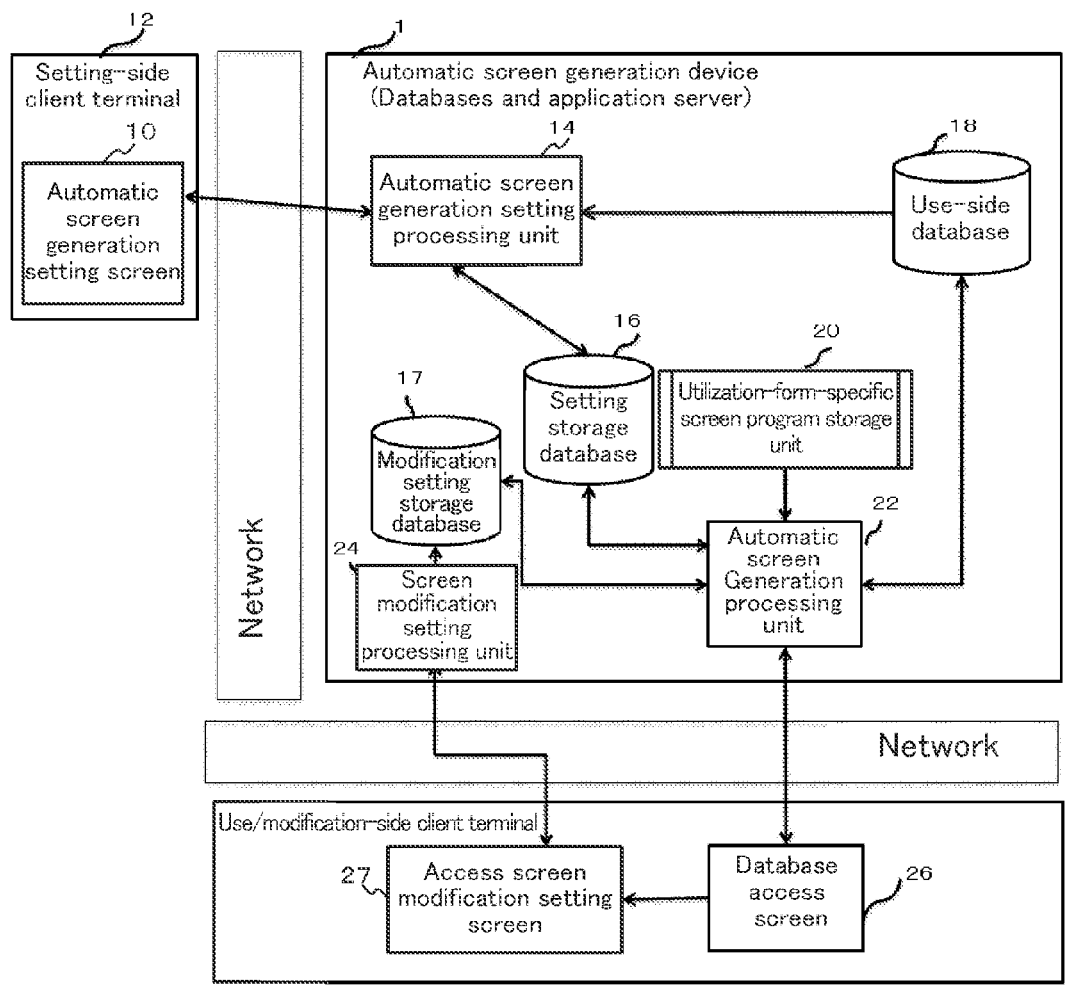

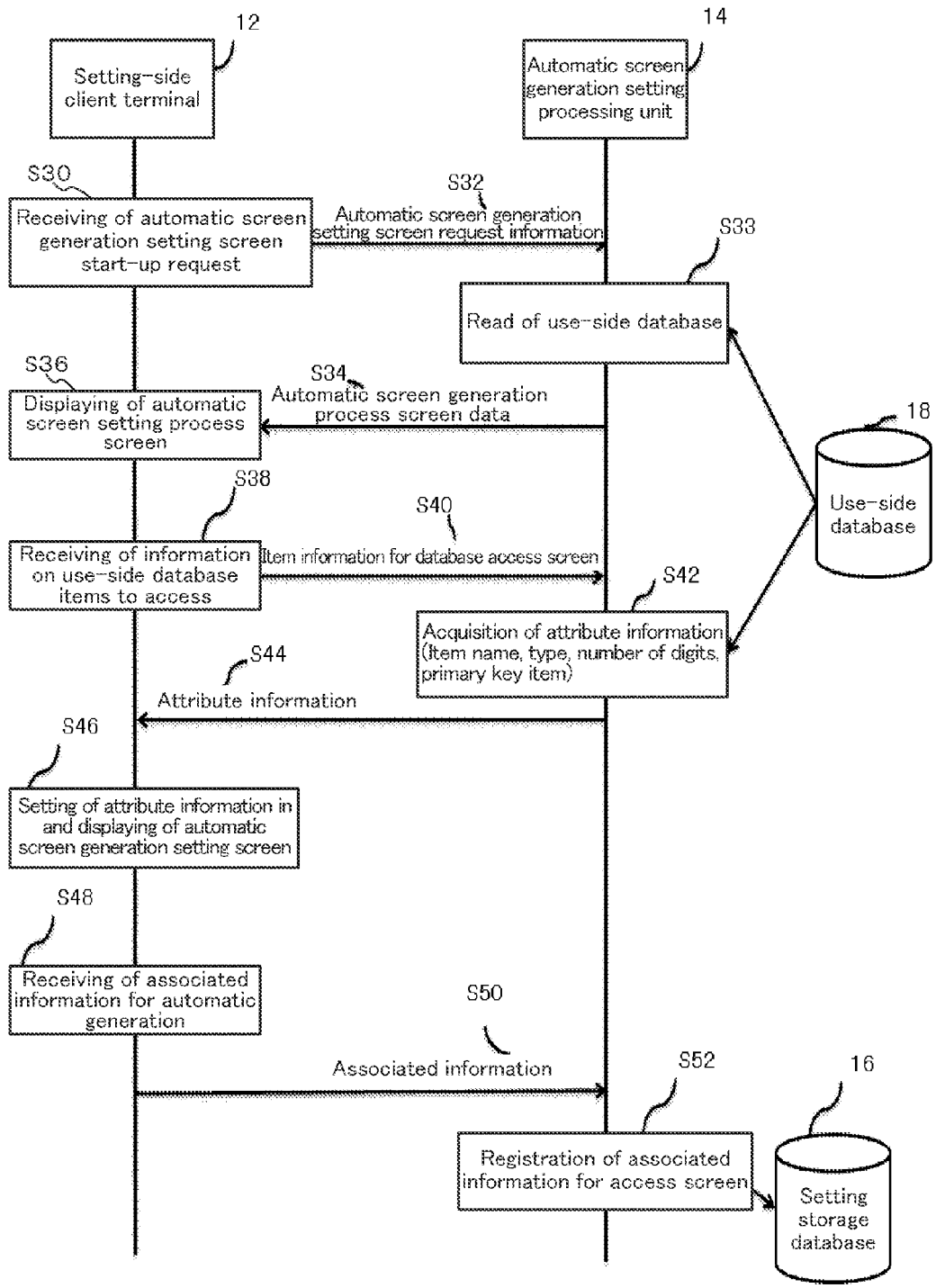

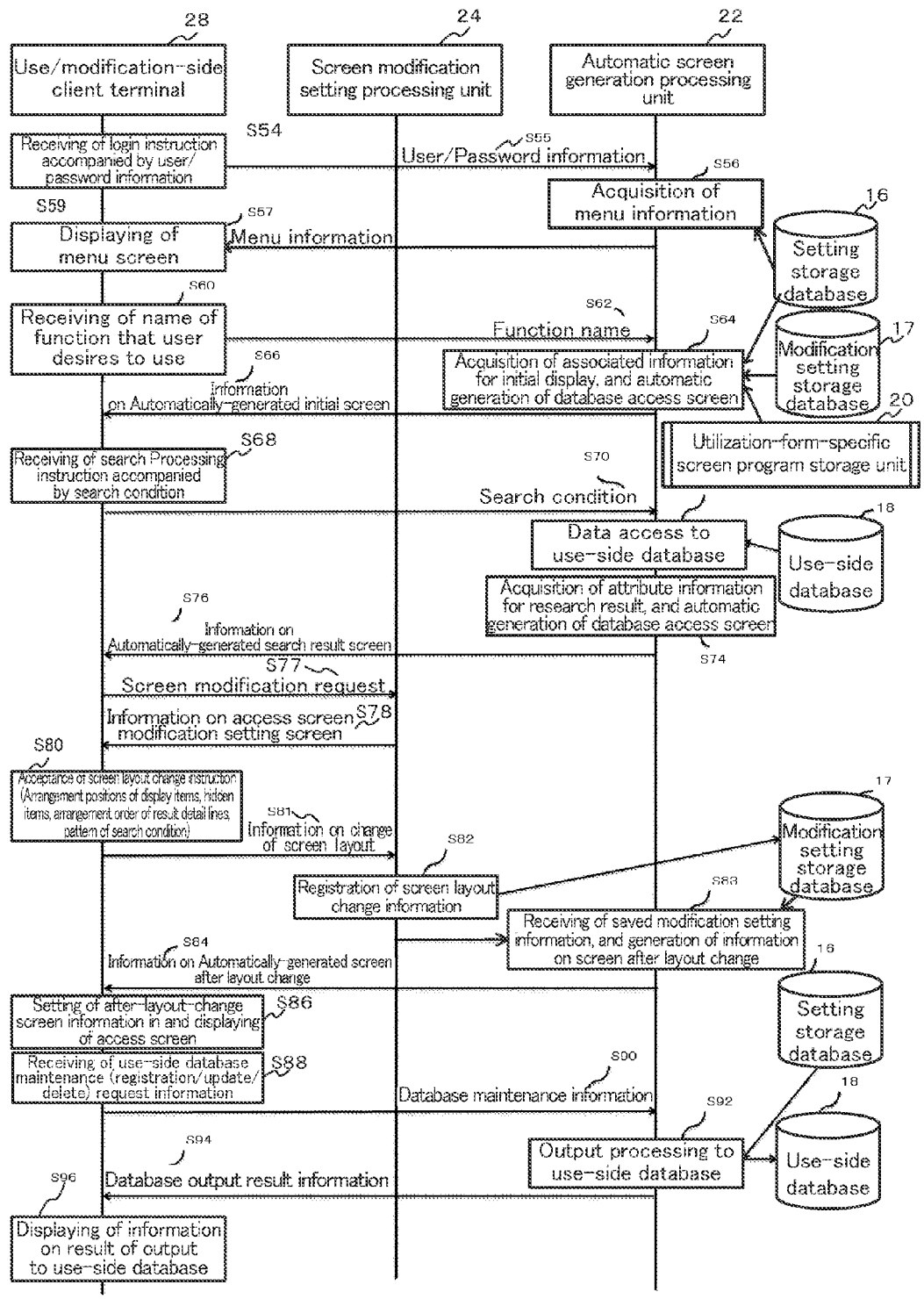
Fig. 3 Automatic screen generation processing sequence diagram

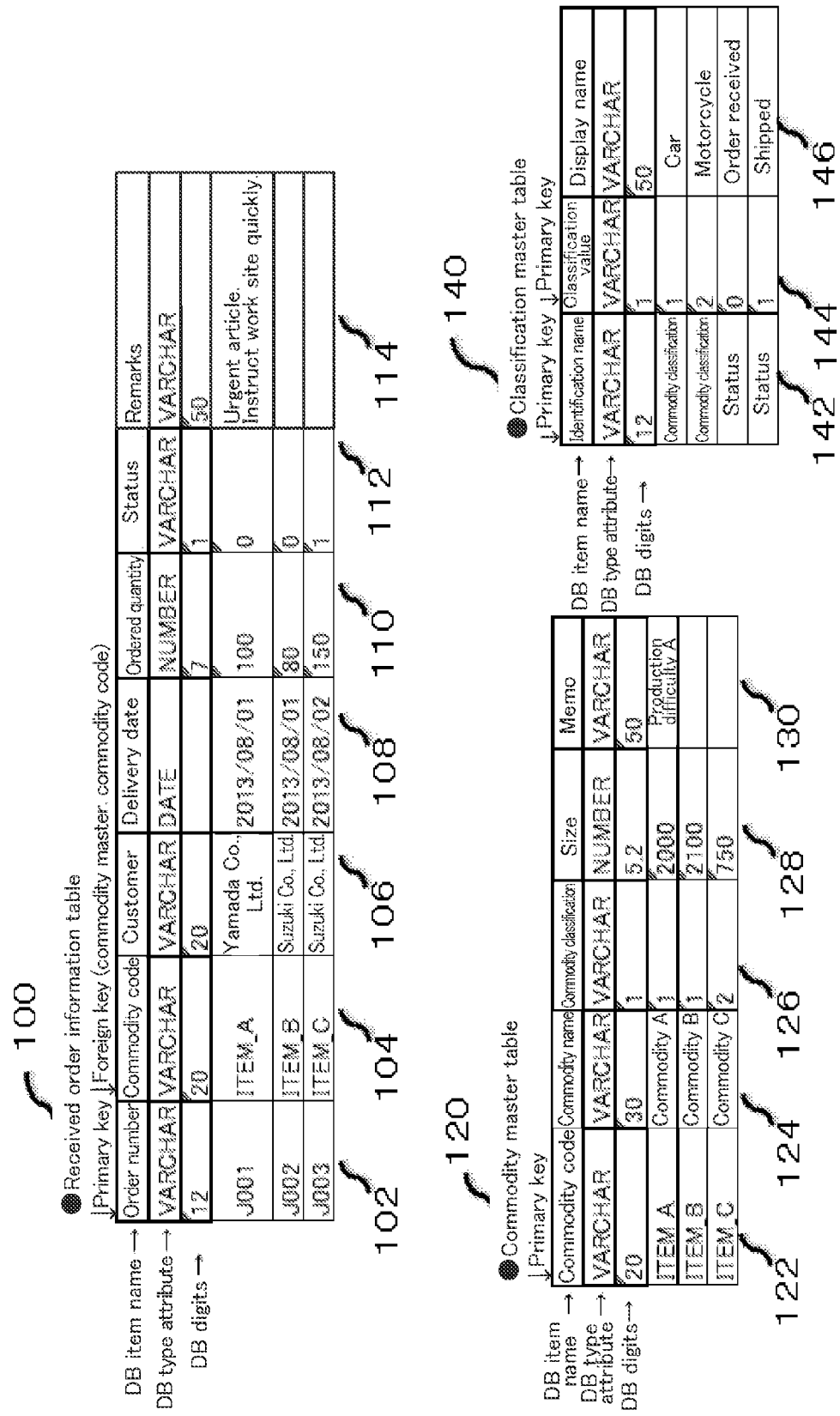
Fig. 4 Sample of use-side database

Fig. 5 Automatic screen generation setting screen (Item setting)

●Automatic screen generation setting screen

| Function name | Received order list maintenance | Output table | Received order information ▽ | Utilization form | Detailed list form ▽ |

▼User-side database list ~188

・Received order information

| ☑ | Order number | 1 |
| ☑ | Commodity code | 2 |
| ☑ | Customer | 5 |
| ☑ | Delivery date | 6 |
| ☑ | Ordered quantity | 7 |
| ☑ | Status | 8 |

・Commodity master

| ☑ | Commodity code | |
| ☑ | Commodity name | 3 |
| ☑ | Commodity classification | 4 |
| | Size | |
| | Memo | |

・Classification master

| | Identification name | |
| | Key | |
| | Display | |

191    193

190

[Generate SQL statement] 192

SQL result ~194

```
SELECT    RECEIVED_ORDER_INFORMATION.ORDER_NUMBER
          RECEIVED_ORDER_INFORMATION.COMMODITY_CODE
          COMMODITY_MASTER.COMMODITY_NAME
          COMMODITY_MASTER.COMMODITY_CLASSIFICATION
          RECEIVED_ORDER_INFORMATION.CUSTOMER
          RECEIVED_ORDER_INFORMATION.DELIVERY_DATE
          RECEIVED_ORDER_INFORMATION.ORDER_QUANTITY
          RECEIVED_ORDER_INFORMATION.STATUS
FROM      RECEIVED_ORDER
          INNER JOIN COMMODITY_MASTER ON COMMODITY_MASTER.COMMODITY_CODE
              = RECEIVED_ORDER_INFORMATION.COMMODITY_CODE
```

[Read SQL statement] 195

| Item setting | Attribute setting | General setting | Access setting |
| 196 | 198 | 200 | 202 |

---

●Automatic screen generation setting screen

| Function name | Commodity master single sheet maintenance | Output table | Commodity master ▽ | Utilization form | Single sheet form ▽ |

▼User-side database list ~188

・Received order information

| | Order number | |
| | Commodity code | |
| | Customer | |
| | Designated delivery date | |
| | Ordered quantity | |
| | Status | |

・Commodity master

| ☑ | Commodity code | 1 |
| ☑ | Commodity name | 2 |
| ☑ | Commodity classification | 3 |
| ☑ | Size | 4 |
| ☑ | Memo | 5 |

・Classification master

| | Identification name | |
| | Key | |
| | Display | |

191    193

190

[Generate SQL statement] 192

SQL result ~194

```
SELECT    COMMODITY_MASTER.COMMODITY_CODE
          COMMODITY_MASTER.COMMODITY_NAME
          COMMODITY_MASTER.COMMODITY_CLASSIFICATION
          COMMODITY_MASTER.SIZE
          COMMODITY_MASTER.COMMODITY_MEMO
FROM      COMMODITY_MASTER
```

[Read SQL statement] 195

| Item setting | Attribute setting | General setting | Access setting |
| 196 | 198 | 200 | 202 |

Fig. 6 Automatic screen generation setting screen (Attribute setting)

Top table (220): Automatic screen generation setting screen (Attribute setting) 184 — 186
Function name: Received order list maintenance | Output table: Received order information | Utilization form: Detailed list form

| Arrangement order | DB item name | Display item name | Group name | Linefeed | Primary key | Update object | Display/Input format | Display width digit | Height | Com-pulsory | Classification display | Input check pattern | Transition destination argument |
|---|---|---|---|---|---|---|---|---|---|---|---|---|---|
| 1 | Order number | | | | L | | string ▽ | 12 | L | | ▽ | | |
| 2 | Commodity code | | | | | | string ▽ | 20 | L | | ▽ | | L |
| 3 | Commodity name | | | | | | string ▽ | 30 | | | ▽ | | |
| 4 | Commodity classification | | | | | | string ▽ | 1 | | | Check box ▽ | | |
| 5 | Customer | Customer name | | | | | string ▽ | 20 | | | ▽ | | |
| 6 | Delivery date | | | | | | Date ▽ | | | | ▽ | >= 2000/01/01 | |
| 7 | Ordered quantity | | | | | | Quantity ▽ | 7 | | | ▽ | >=1 <=5000 | |
| 8 | Status | | | | | | string ▽ | 1 | L | | Radio ▽ | | |
| 9 | Remarks | | | | | | string ▽ | 50 | -1 | | ▽ | | |

Tabs: Item setting (196) | Attribute setting (198) | General setting (200) | Access setting (202)  — 228, 236

221 222 223 182 230 232 234 238 240 242 244

Bottom table (246): Automatic screen generation setting screen (Attribute setting) 209 — 208
Function name: Commodity master single sheet maintenance | Output table: Commodity master | Utilization form: Single sheet form

| Arrangement order | DB item name | Display item name | Group name | Linefeed | Primary key | Update object | Display/Input format | Display width digit | Height | Com-pulsory | Classification display | Input check pattern | Transition destination argument |
|---|---|---|---|---|---|---|---|---|---|---|---|---|---|
| 1 | Commodity code | | | | | | string ▽ | 20 | L | | ▽ | | |
| 2 | Commodity name | | Main area | | | | string ▽ | 30 | L | | ▽ | | |
| 3 | Commodity classification | | | L | | | string ▽ | 1 | L | | List ▽ | | |
| 4 | Size | | | | | | Numerical value ▽ | 5,2 | | | ▽ | | |
| 5 | Memo | | Subarea | | | | string ▽ | 50 | 5 | | ▽ | | |

Tabs: Item setting (196) | Attribute setting (198) | General setting (200) | Access setting (202) — 228, 236

221 222 223 224 226 230 232 234 238 240 242 244

Fig. 7 Automatic screen generation setting screen (General setting)
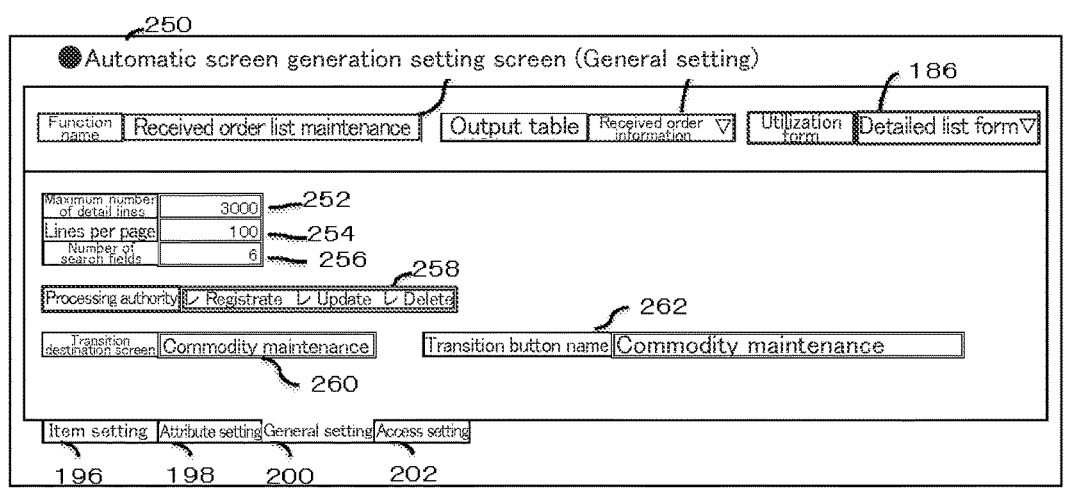
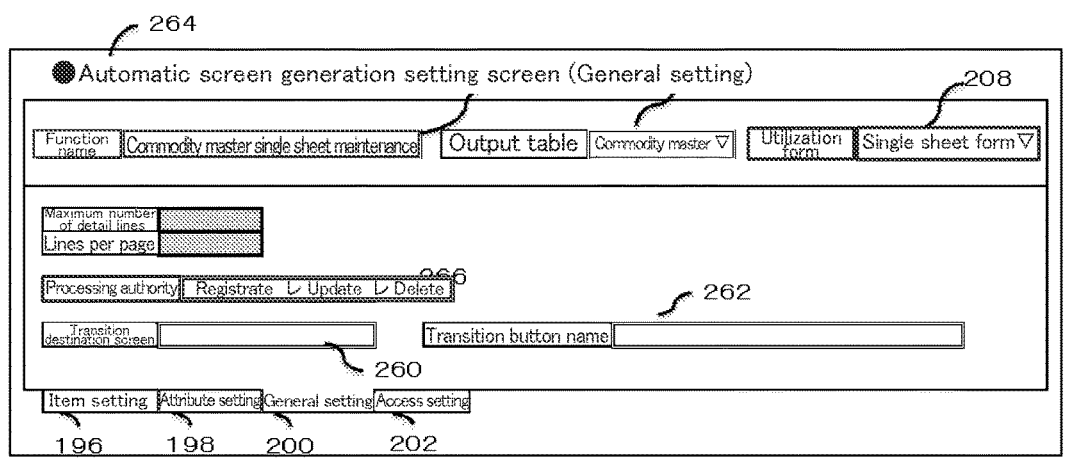

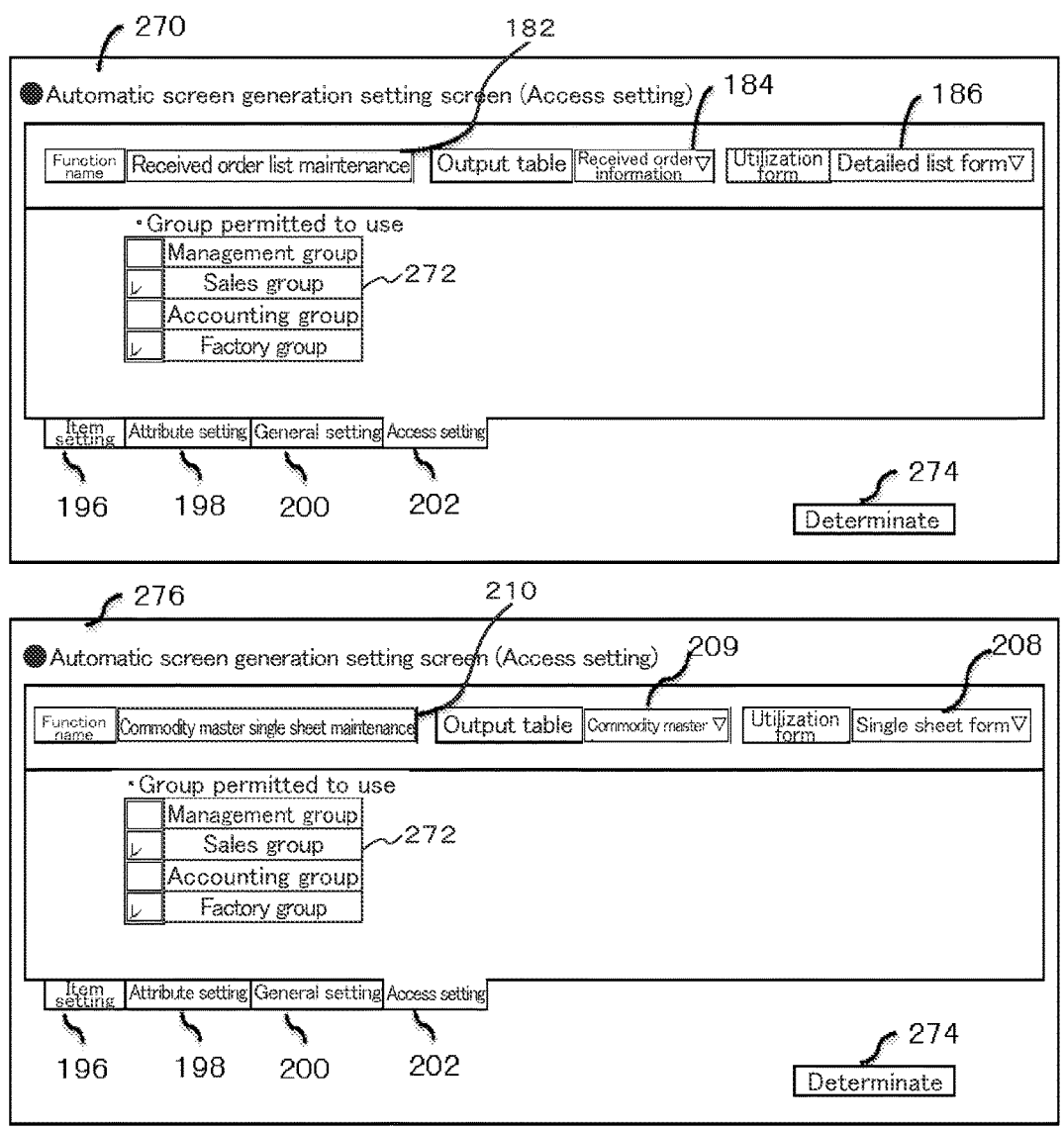
Fig. 8 Automatic screen generation setting screen (Access setting)

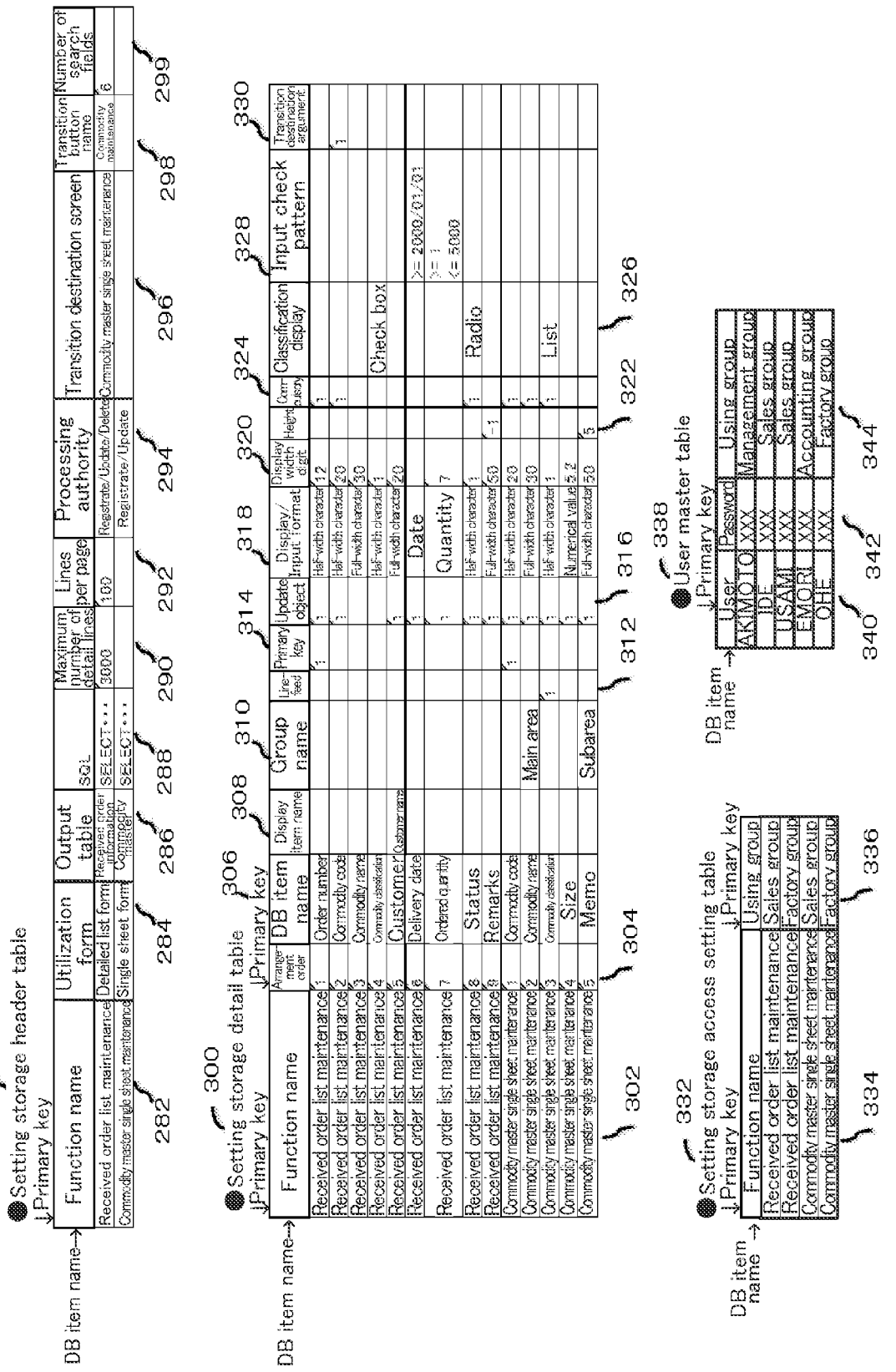
Fig. 9 Setting storage database

Fig. 10 Use-side login screen/menu screen
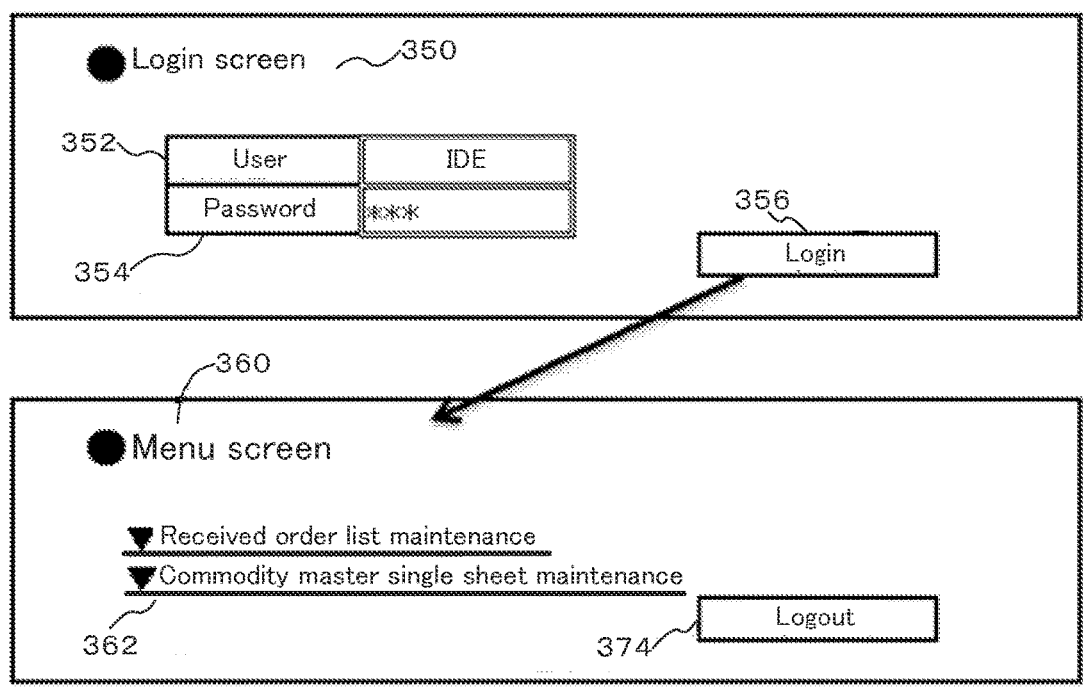

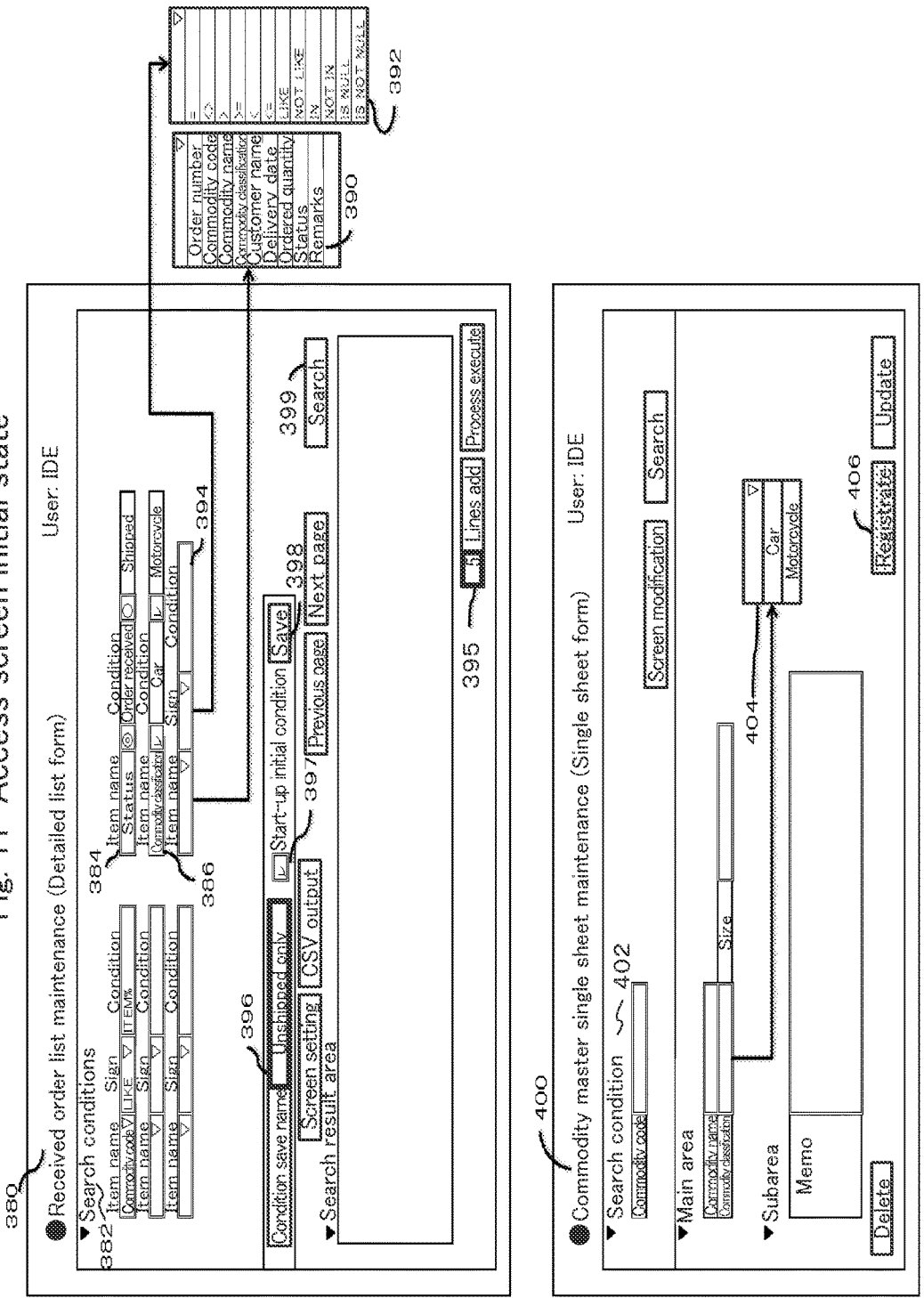
Fig. 11 Access screen initial state

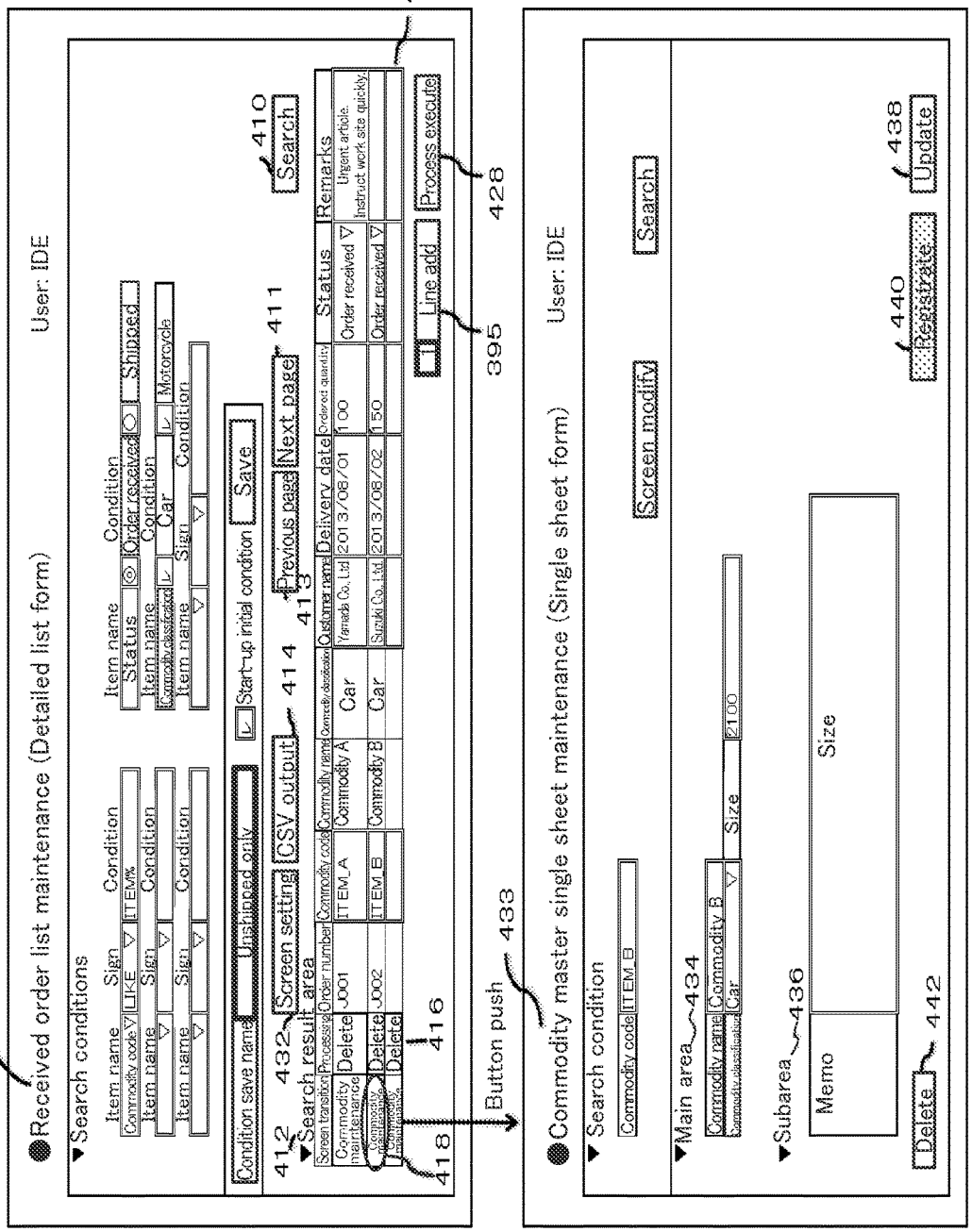
Fig. 12 Access screen after-search state

Fig. 13 Access screen modification setting screen
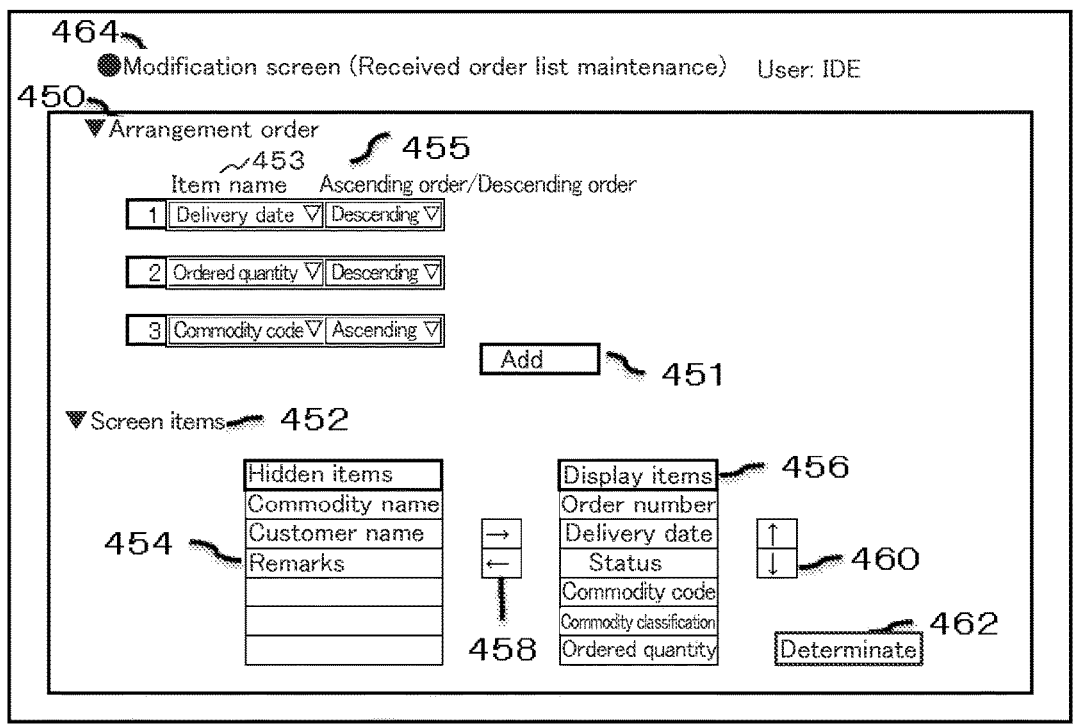
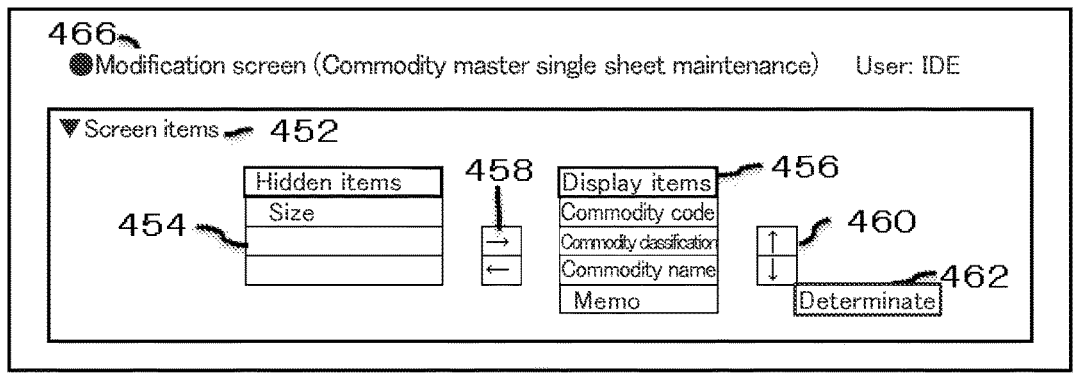

Fig. 14

Modification setting storage database

470

● Modification setting storage table

| Primary key | Primary key | Primary key | | Primary key | | | |
|---|---|---|---|---|---|---|---|
| Function name | User | Display/Arrangement order classification | Order | Item name | Ascending order/Descending order | Display/Hidden |
| Received order list maintenance | IDE | Arrangement order | 1 | Delivery date | Descending | |
| Received order list maintenance | IDE | Arrangement order | 2 | Ordered quantity | Descending | |
| Received order list maintenance | IDE | Arrangement order | 3 | Commodity code | Ascending | |
| Received order list maintenance | IDE | Display | 1 | Order number | | Display |
| Received order list maintenance | IDE | Display | 2 | Delivery date | | Display |
| Received order list maintenance | IDE | Display | 3 | Status | | Display |
| Received order list maintenance | IDE | Display | 4 | Commodity code | | Display |
| Received order list maintenance | IDE | Display | 5 | Commodity classification | | Display |
| Received order list maintenance | IDE | Display | 6 | Ordered quantity | | Display |
| Received order list maintenance | IDE | Display | 7 | Commodity name | | Hidden |
| Received order list maintenance | IDE | Display | 8 | Customer name | | Hidden |
| Received order list maintenance | IDE | Display | 9 | Remarks | | Hidden |
| Commodity master single sheet maintenance | IDE | Display | 1 | Commodity code | | Display |
| Commodity master single sheet maintenance | IDE | Display | 2 | Commodity classification | | Display |
| Commodity master single sheet maintenance | IDE | Display | 3 | Commodity name | | Display |
| Commodity master single sheet maintenance | IDE | Display | 4 | Memo | | Display |
| Commodity master single sheet maintenance | IDE | Display | 5 | Size | | Hidden |

472  474  476  478  480  482  484

DB item name →

486

● Search condition storage table

| Primary key | Primary key | Primary key | Primary key | | | | |
|---|---|---|---|---|---|---|---|
| Function name | User | Condition save name | Search number | Search item | Search sign | Search condition | Start-up classification |
| Received order list maintenance | IDE | Unshipped only | 1 | Commodity code | LIKE | ITEMS | Start-up condition |
| Received order list maintenance | IDE | Unshipped only | 2 | Status | | 0 | Start-up condition |
| Received order list maintenance | IDE | Unshipped only | 4 | Commodity classification | | 1,2 | Start-up condition |

488  490  492  496  498  500  502  504

Fig. 15 Access screen after-modification state

AUTOMATIC SCREEN GENERATION DEVICE, AUTOMATIC SCREEN GENERATION PROGRAM, AND AUTOMATIC SCREEN GENERATION METHOD

This application is the U.S. national phase of International Application No. PCT/JP2014/071250 filed 11 Aug. 2014 which designated the U.S. and claims priority to JP Patent Application No. 2013-168081 filed 13 Aug. 2013, the entire contents of each of which are hereby incorporated by reference.

TECHNICAL FIELD

The present invention relates to technique of improving simplification and efficiency in screen construction in the case where a screen involving database access is to be constructed or modified. To that end, the present invention eliminates the need for construction that uses a programming language, by saving contents that are set by a setting person through an automatic screen generation setting screen, so that a screen involving database access can be automatically generated according to the saved contents.

BACKGROUND ART

To construct and modify a screen that involves database access, it is necessary to use both a screen processing programming language (such as HTML, JavaScript®, Java®, C#, or the like) and a database manipulation language (SQL). This requires a high level of expertise, and it takes several days to construct the screen that involves database access even if a professional programmer works. Further, when it is desired to modify a once-completed screen that involves database access, it is necessary in many cases to request the professional programmer who constructed the screen to modify the screen.

Until now, there have been methods considered for simply constructing a system without using a programming language as much as possible in constructing a screen involving database access. As technique of automatic program generation of a database access screen, it is possible to mention "Automatic Program Generation Device" described in Patent Literature 1 and "Method of and Device for Database Access" described in Patent Literature 2.

CITATION LIST

Patent Literature

Patent Literature 1: Japanese Published Unexamined Patent Application No. 2000-20295
Patent Literature 2: Japanese Published Unexamined Patent Application No. 1994-068151

SUMMARY OF INVENTION

Technical Problem

The above-mentioned Patent Literature 1 describes "Automatic Program Generation Device" and discloses a method that can construct a screen by simply settings of screen to be constructed through a dedicated setting screen. This method, however, can construct only one pattern of screen (screen of a single sheet form), and cannot change the screen layout according to each user. Further, in the part of outputting to a database, this method needs call of an external program, and this requires complex programming. After all, it is needed for an expert to carry out programming work that takes a long time.

According to "Method of and Device for Database Access" described in Patent Literature 2, although database access can be performed, a user can use database only through on-screen information set by a setting person, and the user himself cannot change the screen layout. Thus, a lot of labor is required, for example when a similar screen is prepared as need arises. Further, a constructed screen is insufficient as a database access screen, because the screen does not support authority of use for each user, which is usually needed for a database access screen, and the screen does not have a function of transitioning from a database access screen A to a database access screen B with values being passed between them.

The present invention has been made to solve the above problems, and an object of the invention is to provide technique that makes it possible for a person having no knowledge of programming to construct and modify a database access screen, without requiring a programming language and a database manipulation language. This is attained by saving setting contents set by a setting person, and by automatically generating a database access screen of a single sheet form or a detailed list form corresponding to a utilization form according to setting contents selected by a user and a screen program.

Solution to Problem

To solve the above problems, the present invention provides an automatic screen generation device for generating user-side database access screens automatically, wherein:
the automatic screen generation device comprises:
a use-side database, which has a plurality of tables each storing a plurality of use-side records each having a plurality of fields;
a setting storage database, which stores a setting save record including at least one field of use-side records, attribute information of the field, a utilization form, and identification information and primary key information of the table registering the use-side records;
a utilization-form-specific screen program storage means, which stores programs for generating automatically the access screens corresponding respectively to utilization forms;
an automatic screen generation processing means, which reads, from the utilization-form-specific screen program storage means, a program corresponding to a utilization form included in a setting save record read from the setting storage database according to an instruction from a user, to generate an access screen corresponding to the utilization form by the program; and
a use-side database update means, which updates the use-side database through each access screen generated by the automatic screen generation processing means;
the automatic screen generation processing means reads the setting save record from the setting storage database according to the instruction from the user, specifies the table having the identification information included in the setting save record among the tables stored in the use-side database, displays fields, which are included in the setting save record, of the use-side records stored in the specified table according to the attribute information, which is included in the setting save record, of the fields in question on the access screen corresponding to the utilization form; and the use-side database update means registers, updates or deletes a use-side record, which is specified by the primary key information included in the setting save record, in the table specified by the identification information included in the setting save record among the tables stored in the use-side database, according to an operation received from the user through the access screen.

Here, it is possible that:

the automatic screen generation device further comprises a modification setting storage database, which stores a modification setting save record including at least one field of the setting save record stored in the setting storage database and attribute information modifying the field; and the automatic screen generation processing means reads the setting save record from the setting storage database according to the instruction from the user, reads the modification setting save record from the modification setting storage database, specifies the table having the identification information included in the setting save record among the tables stored in the use-side database, and displays fields, which are included in the setting save record and the modification setting save record, of the use-side records stored in the specified table according to the attribute information, which is included in the setting save record and the modification setting save record, of the fields in question on the access screen corresponding to the utilization form.

Further, it is possible that the automatic screen generation device further comprises:

an automatic screen setting processing means, which acquires the at least one field of the use-side records, the attribute information of the field, the utilization form, and the identification information and the primary key information of the table registering the use-side records, and stores a setting save record, which includes the acquired field, the attribute information of the field, the utilization form, and the acquired identification information and the primary key information of the table, in the setting storage database.

Further, it is possible that the automatic screen generation device further comprises:

a screen modification setting means, which acquires the at least one field of the setting save record of the setting storage database and the attribute information modifying the field, and stores a modification setting save record, which includes the acquired field and the attribute information modifying the field, in the modification setting storage database.

Further, the present invention provides an automatic screen generation program for making a computer generate an access screen to a use-side database, wherein:

the automatic screen generation program makes the computer function as:

a use-side database, which has a plurality of tables each storing a plurality of use-side records each having a plurality of fields;

a setting storage database, which stores a setting save record including at least one field of use-side records, attribute information of the field, a utilization form, and identification information and primary key information of the table registering the use-side records;

a utilization-form-specific screen program storage means, which stores utilization-form-specific programs for generating automatically the access screens corresponding respectively to utilization forms;

an automatic screen generation processing means, which reads, from the utilization-form-specific screen program storage means, a utilization-form-specific program corresponding to a utilization form included in a setting save record read from the setting storage database according to an instruction from a user, to generate an access screen corresponding to the utilization form by the utilization-form-specific program; and a use-side database update means, which updates the use-side database through each access screen generated by the automatic screen generation processing means;

the automatic screen generation processing means reads the setting save record from the setting storage database according to the instruction from the user, specifies the table having the identification information included in the setting save record among the tables stored in the use-side database, displays fields, which are included in the setting save record, of the use-side records stored in the specified table according to the attribute information, which is included in the setting save record, of the fields in question on the access screen corresponding to the utilization form; and the use-side database update means registers, updates or deletes a use-side record, which is specified by the primary key information included in the setting save record, in the table specified by the identification information included in the setting save record among the tables stored in the use-side database, according to an operation received from the user through the access screen.

Further, the present invention provides an automatic screen generation method for generating use-side database access screens automatically by using an automatic screen generation device, wherein:

the automatic screen generation device comprises:

a use-side database, which has a plurality of tables each storing a plurality of use-side records each having a plurality of fields;

a setting storage database, which stores a setting save record including at least one field of use-side records, attribute information of the field, a utilization form, and identification information and primary key information of the table registering the use-side records; and a utilization-form-specific screen program storage means, which stores programs for generating automatically the access screens corresponding respectively to utilization forms; and the method comprises steps of:

reading a setting save record from the setting storage database according to an instruction from a user;

reading a program corresponding to the utilization form included in the setting save record from the utilization-form-specific screen program storage means;

specifying a table having the identification information included in the setting save record among the tables stored in the use-side database; and displays fields, which are included in the setting save record, of the use-side records stored in the specified table according to the attribute information, included in the setting save record, of the fields on an access screen corresponding to the utilization form by the read program;

receiving an operation from the user through the access screen; and registering, updating or deleting a use-side record, which is specified by the primary key information included in the setting save record, in the table specified by the identification information included in the setting save record among the tables stored in the use-side database.

Advantageous Effects of Invention

According to the present invention, a user without expert knowledge can construct a program of which an expert of system architecture generally requires several days for construction. Further, it becomes possible to construct a database access screen only by inputting setting in an automatic screen generation setting screen without using a programming language. Thus, a database access screen can be constructed in a few minutes at the shortest. Accordingly, it is possible to reduce costs of constructing a screen involving database access, and to shorten the development period. Further, development by a user without expert knowledge can be realized, and information system can be used more efficiently than ever.

BRIEF DESCRIPTION OF DRAWINGS

FIG. 1 is a functional block diagram showing an automatic screen generation device according to an embodiment of the present invention;

FIG. 2 is a sequence diagram for explaining automatic screen generation setting processing in an automatic screen generation device according to an embodiment of the present invention;

FIG. 3 is a sequence diagram for explaining automatic screen generation processing in an automatic screen generation device according to an embodiment of the present invention;

FIG. 4 shows structure of a use-side database and an example of sample data;

FIG. 5 shows an example of an item setting screen of an automatic screen generation setting screen;

FIG. 6 shows an example of an attribute setting screen of the automatic screen generation setting screen;

FIG. 7 shows an example of a general setting screen of the automatic screen generation setting screen;

FIG. 8 shows an example of an access setting screen of the automatic screen generation setting screen;

FIG. 9 shows structure of a setting storage database and an example of sample data;

FIG. 10 shows examples of a login screen and a menu screen in a use-side terminal;

FIG. 11 shows an example of the initial state of an access screen;

FIG. 12 shows an example of a state of the access screen after search;

FIG. 13 shows an example of an access screen modification setting screen;

FIG. 14 shows structure of a modification setting storage database and an example of sample data; and FIG. 15 shows an example of a state of the access screen after modification.

DESCRIPTION OF EMBODIMENTS

Now, an embodiment of the present invention will be described.

FIG. 1 is a schematic block diagram showing an automatic screen generation device according to an embodiment of the present invention.

As shown in the figure, the automatic screen generation device of the present embodiment comprises: a use-side database 18; a setting storage database 16; a modification setting storage database 17; a utilization-form-specific screen program storage unit 20; an automatic screen generation setting processing unit 14; an automatic screen generation processing unit 22; and a screen modification setting processing unit 24.

The use-side database 18 is a database made by a user, and for example a received order management database can be mentioned as the use-side database 18. FIG. 4 shows a sample of the received order management database. Each record stored in a received order information table 100 has a field of order number 102, which is registered as a primary key, and further has fields of commodity code 104, customer 106, delivery date 108, order quantity 110, status 112, and remarks 114. Each record stored in a commodity master table 120 has a field of commodity code 122, which is registered as a primary key, and further has fields of commodity name 124, commodity classification 126, size 128, and memo 130. Each record stored in a classification master table 140 has fields of identification name 142 and classification value 144, which are registered as primary keys, and further has a field of display name 146.

FIG. 9 shows an example of the setting storage database 16. Each record stored in a setting storage header table 280 has a field of function name 282, which is registered as a primary key, and further has fields of utilization form 284, output table 286, SQL 288, maximum number of detail lines 290, lines per page 292, processing authority 294, transition destination screen 296, transition button name 298, and search field 299. Each record stored in a setting storage detail table 300 has fields of function name 302 and arrangement order 304, which are registered as primary keys, and further has fields of DB item name 306, display item name 308, group name 310, linefeed 312, primary key 314, update object 316, display/input format 318, display width digit 320, height 322, compulsory 324, classification display 326, input check pattern 328, and transition destination argument 330. Each record stored in a setting storage access setting table 332 has fields of function name 334 and using group 336, which are registered as primary keys. Each record stored in a user master table 338 has a field of user 340, which is registered as a primary key, and further has fields of password 342 and using group 344.

FIG. 14 shows an example of the modification setting storage database 17. Each record stored in a modification setting storage table 470 has fields of function name 472, user 474, display/arrangement-order classification 476, and order 478, which are registered as primary keys, and further has fields of item name 480, ascending/descending order 482, and display/hidden 484.

The utilization-form-specific screen program storage unit 20 stores a detailed list form program, a single sheet form program, a login screen construction program, and a menu screen construction program.

When the automatic screen generation setting processing unit 14 is accessed from a setting-side client terminal 12 through a network, the automatic screen generation setting processing unit 14 makes the setting-side client terminal 12 display an automatic screen generation setting screen 10. Then, when the automatic screen generation setting processing unit 14 receives item information for automatic screen generation from the setting-side client terminal 12, the automatic screen generation setting processing unit 14 accesses the use-side database 18 on the basis of the item information, and acquires attribute information of the database, to set the attribute information in the automatic screen generation setting screen 10. Further, when the automatic screen generation setting processing unit 14 receives associated information of the attribute information set in the automatic screen generation setting screen 10 from the setting-side client terminal 12, the automatic screen generation setting processing unit 14 saves the associated information in the setting storage database 16.

When the automatic screen generation processing unit 22 is accessed with designation of a function name from a use/modification-side client terminal 28 through the network, then, on the basis of the function name, the automatic screen generation processing unit 22 reads information on the items used in the use-side database 18 from the setting storage database 16 and program information for calling program from the utilization-form-specific screen program storage unit 20. Using the obtained information, the automatic screen generation processing unit 22 generates a database access screen 26, and displays the generated database access screen 26 on the use/modification-side client terminal 28 display. In addition, in the case where, in the modification setting storage database 17, there is a record of modification setting data for which the accessing user is registered as the primary key, the automatic screen generation processing unit 22 uses the information of this record to modify the generated database access screen 26, and displays the modified database access screen 26 on the use/modification-side client terminal 28.

When the screen modification setting processing unit 24 receives a modification instruction concerning the database access screen 26 currently displayed on the use/modification-side client terminal 28 through the network, the screen modification setting processing unit 24 saves, in the modification setting storage database 17, a record of modification information including a function name, a user, a display/arrangement-order classification, and order as keys.

The functional configuration of the automatic screen generation device shown in FIG. 1 can be implemented by an ordinary computer such as a personal computer comprising a CPU, a hard disk, a memory, an NIC, a monitor, a keyboard, a mouse, and the like, when the CPU loads prescribed programs from the hard disk into the memory and executes the loaded programs.

Similarly, the functional configurations of the setting-side client terminal 12 and the use/modification-side client terminal 28 shown in FIG. 1 can be each implemented by an ordinary computer such as a personal computer comprising a CPU, a hard disk, a memory, an NIC, a monitor, a keyboard, a mouse, and the like, when the CPU loads prescribed programs from the hard disk into the memory and executes the loaded programs.

FIG. 2 is a sequence diagram for explaining the automatic screen generation setting processing unit of the automatic screen generation device of an embodiment of the present invention.

Here, the description will be given using the received order management database shown in FIG. 4 as a sample of the use-side database 18, and the setting storage database 16 shown in FIG. 9. In the description, the function name for the detailed list form is "received order list maintenance", and the function name for the single sheet form is "commodity master single sheet maintenance". The setting screen examples of the automatic screen generation setting screens shown in FIGS. 5, 6, 7 and 8 are used in the description.

When the setting-side client terminal 12 receives an automatic screen generation setting screen start-up request from a setting person (S30), the setting-side client terminal 12 sends automatic screen generation setting screen request information to the automatic screen generation device (S32). Receiving this, the automatic screen generation setting processing unit 14 of the automatic screen generation device reads in the received order information table 100, the commodity master table 120, and the classification master table 140 from the use-side database 18. Further, the automatic screen generation setting processing unit 14 merges these tables based on foreign key information of these table, generates the automatic screen generation processing screen 10 on the basis of the information, and displays the generated automatic screen generation processing screen 10 on the setting-side client terminal 12 (S33, S34, S36). FIG. 5 shows an example of the automatic screen generation processing screen 10 that is generated using the sample of the use-side database 18 shown in FIG. 4. The symbol 180 indicates an example of a detailed list form, and the symbol 206 indicates an example of a single sheet form.

Next, the setting-side client terminal 12 receives a function name 182, an output table 184, and a utilization form 186 of the database access screen 26 to be generated from the setting person through the automatic screen generation setting screen (item setting screen) 10 shown in FIG. 5, and receives selection of item information 191 and arrangement order 193, which are desired to use when the database access screen 26 is generated automatically, from a use-side database list 188 in the automatic screen generation setting screen 10. Further, when an SQL statement generation button 192 is clicked (S38), the setting-side client terminal 12 sends the received information to the automatic screen generation device (S40).

Receiving the sent information, the automatic screen generation setting processing unit 14 generates a SELECT clause by arranging the selected item information 191 of the use-side database 18 in the designated arrangement order 193. In the case where a plurality of selected tables of the use-side database 18 exist at the time of generation, the automatic screen generation setting processing unit 14 generates a FROM clause of SQL by using the foreign key information (104 in FIG. 4) defined in the use-side database 18, to generate an SQL statement. Then, the automatic screen generation setting processing unit 14 displays the completed SQL statement in an SQL statement display pane 194 of the automatic screen generation setting screen 10.

Next, when the setting-side client terminal 12 receives editing of SQL statement directly from the setting person through the automatic screen generation setting screen 10, or when the setting person directly inputs an SQL statement in the SQL statement display pane 194 of the automatic screen generation setting screen 10 without receiving a selection of item information and the like out of the setting through the use-side database list 188 in the automatic screen generation setting screen 10, then the SQL statement is sent to the automatic screen generation device 1 by clicking of an SQL statement read button 195.

On receiving the SQL statement, the automatic screen generation setting processing unit 14 of the automatic screen generation device 1 acquires the attribute information (item name, item type attribute, item digit number information, and output table primary key information) from a database management area, which manages the attribute information, of the use-side database 18 on the basis of the received SQL statement (S42).

For example, in the case of an Oracle® database, COLUMN_NAME: item name, DATA_TYPE: item type attribute, and DATA_LENGTH: item digit number, which are in the USER_TAB_COLUMNS table of the system user, are acquired using a table name and an item name as keys. The primary key information of the output table is acquired by the following SQL statement.

SELECT COLUMN_NAME FROM USER_IND_COLUMNS
WHERE INDEX_NAME IN (
SELECT CONSTRAINT_NAME FROM USER_CONSTRAINTS
WHERE CONSTRAINT_TYPE='P')
WHERE TABLE_NAME=name of output table)

Next, the automatic screen generation setting processing unit 14 of the automatic screen generation device 1 generates arrangement order starting from 1 in the order arranged in the SELECT clause of the SQL statement, and displays the generated arrangement order in the automatic screen generation setting processing screen 10 of the setting-side client terminal 12 (S46). FIG. 6 shows a display example of the automatic screen generation setting processing screen 10. In the figure, the arrangement order is indicated by the numerical symbol 221, the item name is indicated by the numerical symbol 222, the item type attribute is indicated by the numerical symbol 232, the item digit number is indicated by the numerical symbol 234, and the primary key is indicated by the numerical symbol 228.

Next, the setting-side client terminal 12 receives the associated information from the setting person through the automatic screen generation setting processing screen 10 added with the attribute information (S48), and delivers the received associated information to the automatic screen generation setting processing unit 14.

Examples of the associated information are shown in FIGS. 6, 7 and 8, which will be described in the following. Each screen is constructed so that setting is performed while switching the screens by use of tabs (item setting 196, attribute setting 198, general setting 200, and access setting 202).

FIG. 6 shows the automatic screen generation setting screen (attribute setting screen) 10 for setting the attributes of items that are desired to display in the automatic screen generation setting processing unit 14. The numerical symbol 220 indicates an example of the detailed list form, and the numerical symbol 246 indicates an example of the single sheet form.

Automatic attribute setting items of the attribute information, which are set by the automatic screen generation setting processing unit 14 in the step S44 and displayed in the automatic screen generation setting screen 10, are the arrangement order 221, the DB item name 222, the display/input form 232, the display width digit 234, and the primary key 228. Although the primary key 228 cannot be changed by the setting person, all the items except the primary key 228 can be set and changed by the setting person. It is not required to set an item other than the automatic attribute setting items, and the automatic screen generation setting processing unit 14 can generate an access screen even if there is no appended item.

FIG. 7 shows the automatic screen generation setting screen (general setting screen) 10 for setting the associated information to whole of a screen when the automatic screen generation processing unit 14 generates the screen. The numerical symbol 250 indicates an example of the detailed list form, and the numerical symbol 264 indicates an example of the single sheet form.

FIG. 8 shows the automatic screen generation setting screen (access setting screen) 10 for setting which user can use an access screen generated under which function name. The numerical symbol 270 indicates an example of the detailed list form, and the numerical symbol 276 indicates an example of the single sheet form. In this access setting screen, the using group 344 in the user master table 338 of the setting storage database 16 shown in FIG. 9 is read, duplication is removed to display the screen, and the setting of users can be done. In the example of FIG. 8, it is possible to select a management group, a sales group, an accounting group, and a factory group. In the shown state, the sales group and the factory group have been selected.

When the setting-side client terminal 12 receives the associated information from the setting person through the automatic screen generation setting screen 10 (the item setting screen of FIG. 5, the attribute setting screen of FIG. 6, the general setting screen of FIG. 7, and the access setting screen of FIG. 8) (S48), sends the associated information to the automatic screen generation device (S50).

On receiving the associated information from the use-side client terminal 12, the automatic screen generation setting processing unit 14 of the automatic screen generation device 1 registers the associated information in the setting storage database 16 (S52).

FIG. 9 shows an example of registration in the setting storage database.

The associated information received from the setting person through the automatic screen generation setting screen 10 (the item setting screen of FIG. 5 and the general setting screen of FIG. 7) is registered in the setting storage header table 280. In detail, the function names 182 and 210 are registered in the field of the function name 282, the output tables 184 and 209 are registered in the field of the output table 286, the utilization forms 186 and 208 are registered in the field of the utilization form 284, the SQL result 194 are registered in the field of the SQL 288, the maximum number of detail lines 252 are registered in the field of the maximum number of detail lines 290, the lines per page 254 are registered in the field of the lines per page 292, the number of search fields 256 are registered in the field of the number of search fields 299, the processing authority 258 are registered in the field of the processing authority 294, the transition destination screen 260 are registered in the field of the transition destination screen 296, and the transition button name 262 are registered in the field of the transition button name 298.

Further, the associated information received from the setting person through the automatic screen generation setting screen 10 (the attribute setting screen of FIG. 6) is registered in the setting storage detail table 300. The function names 182 and 210 are registered in the field of the function name 282, the arrangement orders 221 are registered in the field of the arrangement order 304, the DB item names 222 are registered in the field of the DB item name 306, the display item name 223 are registered in the field of the display item name 308, the group names 224 are registered in the field of the group name 310, the linefeed 226 are registered in the field of the linefeed 312, the primary keys 228 are registered in the field of the primary key 314, the update objects 230 are registered in the field of the update object 316, the display/input forms 232 are registered in the field of the display/input form 318, the display width digits 234 are registered in the field of the display width digit 320, the heights 236 are registered in the field of the height 322, the compulsory 238 are registered in the field of the compulsory 324, the classification displays 240 are registered in the classification display 326, the input check patterns 242 are registered in the field of the input check pattern 328, and the transition destination argument 244 are registered in the field of the transition destination argument 330.

Further, the associated information received from the setting person through the automatic screen generation setting screen 10 (the access setting screen of FIG. 8) is registered in the setting storage access setting table 332. The function names 182, 210 are registered in the field of the function name 334, and the groups permitted to use 272 are registered in the field of using group 336.

FIG. 3 is a sequence diagram for explaining the automatic screen generation processing unit 22 of the automatic screen generation device of an embodiment of the present invention.

Figure 15:
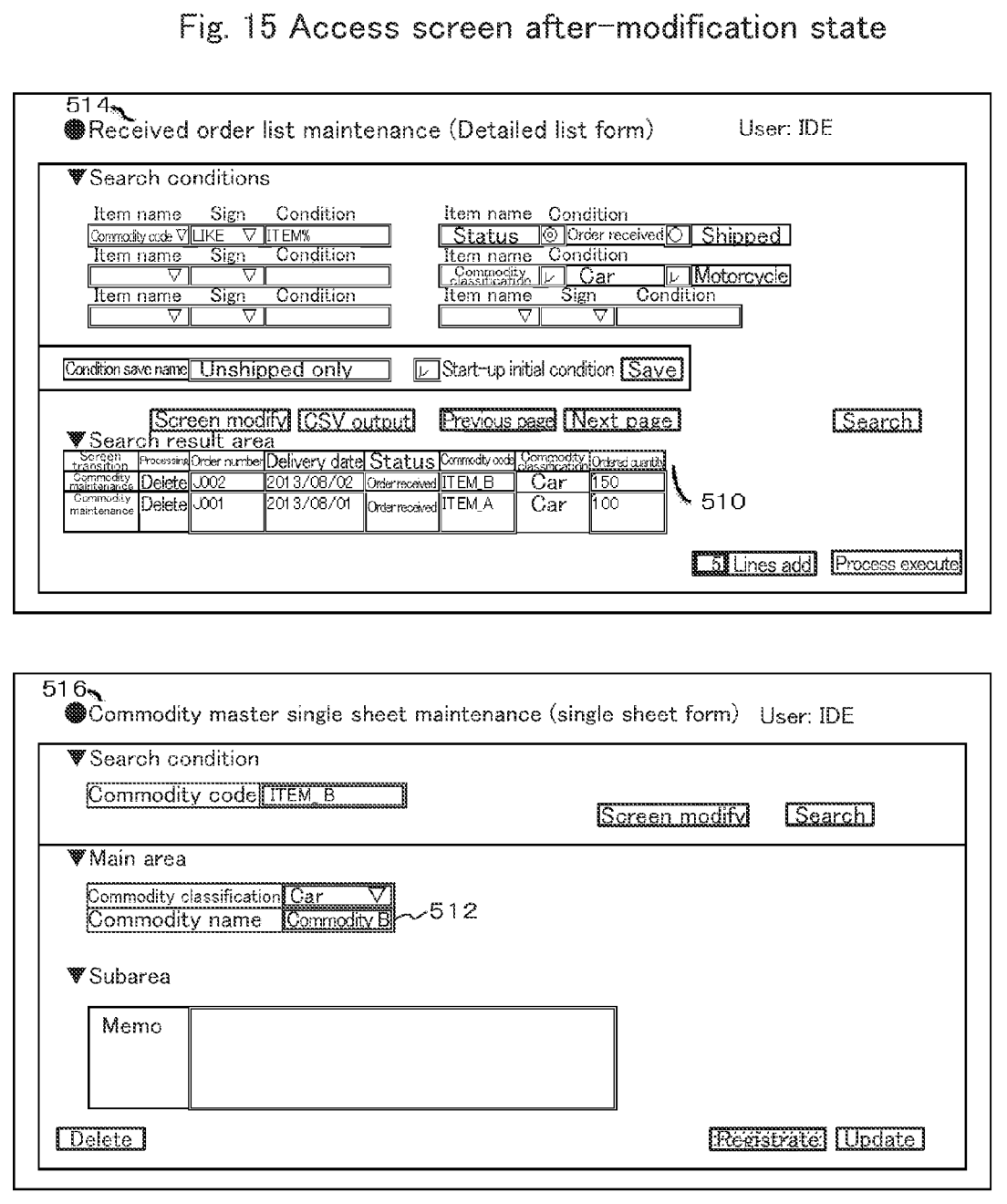

Here, the received order management database shown in FIG. 4 is used as a sample of the use-side database 18, the example shown in FIG. 9 is used as the setting storage database 16, and the example shown in FIG. 14 is used as the modification setting storage database. And "received order list maintenance" is the function name for the detailed list form, and "commodity master single sheet maintenance" is the function name for the single sheet form. Further the login/menu screen example shown in FIG. 10, the initial-state access screen example shown in FIG. 11, the after-search-state access screen example shown in FIG. 12, the access screen modification setting screen example shown in FIG. 13, and the after-modification access screen example shown in FIG. 15 are used.

When the use/modification-side client terminal 28 receives a login request from a user, the use/modification-side client terminal 28 sends the login request to the automatic screen generation device 1. On receiving this login request, the automatic screen generation processing unit 22 of the automatic screen generation device 1 generates a login screen 350, and displays the generated login screen 350 on the use/modification-side client terminal 28. Next, when the use/modification-side client terminal 28 receives user information and password information from the user through the login screen 350 (S54), the use/modification-side client terminal 28 sends the user information and the password information to the automatic screen generation device 1 (S55).

On receiving the user information and the password information, the automatic screen generation processing unit 22 of the automatic screen generation 1 device accesses the user master table 338 of the setting storage database 16, to acquire the using group 344 by using the user information and the password information received from the use/modification-side client terminal 28 as keys. In addition, the automatic screen generation processing unit 22 accesses the setting storage access setting table 332 of the setting storage database 16, to acquire the function name 334 by using the acquired using group 344 as a key (S56). Then, the automatic screen generation processing unit 22 generates menu information in which a link to the acquired function is set. And the automatic screen generation processing unit 22 sends the menu information to the user/modification-side client terminal 28 (S57), to make the use/modification-side client terminal 28 display the menu screen 360 shown in FIG. 10 (S59).

In the example shown in FIGS. 9 and 10, functions that the user "IDE" can use are "Received order list maintenance" and "Commodity master single sheet maintenance", and accordingly the menu screen 360 is provided with links allowing use of the received order list maintenance function and the commodity master single sheet maintenance function.

When the use/modification-side client terminal 12 receives, from the user, a function name 362 that the user desires to use through the menu screen (S60), the use/modification-side client terminal 12 sends the received function name 362 together with the user to the automatic screen generation device 1 (S62).

On receiving this, the automatic screen generation processing unit 22 of the automatic screen generation device 1 accesses the setting storage header table 280 (FIG. 9) of the setting storage database 16, and acquires the utilization form 284, the output table 286, the SQL 288, the maximum number of detail lines 290, the lines per page 292, the processing authority 294, the transition destination screen 296, the transition button name 298, and the number of search fields 299 by using the function name 362 received from the use/modification-side client terminal 12 as a key.

Further, the automatic screen generation processing unit 22 accesses the setting storage detail table 300 (FIG. 9) of the setting storage database 16, and acquires the arrangement order 304, the DB item name 306, the display item name 308, the group name 310, the linefeed 312, the primary key 314, the update object 316, the display/input format 318, the display width digit 320, the height 322, the compulsory 324, the classification display 326, the input check pattern 328, and the transition destination argument 330 by using the function name of the setting storage detail table 300 as a key.

Further, the automatic screen generation processing unit 22 accesses the modification setting storage table 470 (FIG. 14) of the modification setting storage database 17, and acquires the display/arrangement-order classification 476, the order 478, the item name 480, the ascending/descending order 482, and the display/hidden 484 by using the function name 362 and the user 352 received from the use/modification-side client terminal 12 as keys.

Further, the automatic screen generation processing unit 22 accesses a search condition storage table 486 (FIG. 14) of the modification setting storage database 17, and acquires a condition save name 492, a search number 496, a search item 498, a search sign 500, and a search condition 502 by using the function name 362 and the user 352 received from the use/modification-side client terminal 12 and an start-up classification 504="start-up condition" as keys. Thereinafter, the Acquired information is called screen modification associated information.

Depending on the acquired value of the utilization form 284, the automatic screen generation processing unit 22 calls either the detailed list form program or the single sheet form program from the utilization-form-specific screen program storage unit 20, and delivers the acquired screen modification associated information to the called program. As a result, the called program generates a database access screen 26 according to the screen modification associated information (S64), and displays the database access screen 26 on the use/modification-side client terminal 28 (S66).

FIG. 11 shows an example of the database access screen 26 in the initial state. Here, the numerical symbol 380 indicates an example of the detailed list form, and the numerical symbol 400 indicates an example of the single sheet form.

In the case of the database access screen 26 in the initial state of the detailed list form 380, when the value of the processing authority 294 acquired includes "registration", a lines addition button 395 is generated in the database access screen 26. When the user sets the number of lines that the user desires to add and clicks the lines addition button 395, then data lines for new registration are generated in a search result area, to allow new registration in the output table 286 designated in the setting storage header table 280 of the setting storage database 16.

In the case of the database access screen 400 in the initial state of the single sheet form, when the value of the processing authority 294 acquired includes "registration", a registration button 406 is generated in the database access screen 400. Click of the registration button 406 by the user allows new registration in the output table 286 designated in the setting storage header table 280 of the setting storage database 16.

The number of search conditions 382 generated is determined by the value of the number of search fields 299 acquired. In the example shown in FIG. 11, six search fields are set. Further, in the example shown in FIG. 11, item name, sign, and condition are set previously. Because the search save name 429="unshipped only" exists in the search condition storage table 486, the values of the search item 492, the search sign 500, and the search condition 502 are displayed in the search condition 382.

Further, as for the field 384 where the item name is "status", 0 or 1 is set by code in the item of status 112 of the received order information table 100, and "radio" is selected in the classification display 326 of the setting storage detail table 300 of the setting storage database 16. Accordingly, the automatic screen generation processing unit 22 acquires the display names from the classification master table 140 by designating the identification name 1420="status", and displays, as the radio button check condition, the state where the display name corresponding to the value of the search condition 502 is checked.

Similarly, as for the field 386 where the item name is "commodity classification", "check box" is selected in the classification display 326. Accordingly, the automatic screen generation processing unit 22 acquires the display names from the classification master table 140 by designating the identification name 142="commodity classification", and displays, as the check box check condition, the state where the display names corresponding to the value of the search condition 502 is checked.

Further, as for the field 404 where the item name is "commodity classification" in the single sheet form, "list" is selected in the classification display 326. Accordingly, the automatic screen generation processing unit 22 acquires the display names from the classification master table 140 by designating the identification name 142="commodity classification", generates a list box, and displays the list box in a state that the user can make selection.

In the data access screen 380 of the list form in the initial state, when the user changes the search conditions (search items, search signs, and search conditions), gives a new name in a condition save name 396, checks a field of an start-up initial condition 387 that requests display as the initial search condition at the time of start-up through the menu, and clicks a save button 398 (S68), then the use/modification-side client terminal 28 sends the mentioned information to the automatic screen generation device 1 (S70).

On receiving the information, the automatic screen generation processing unit 22 of the automatic screen generation device 1 registers the function name received from the use/modification-side client terminal 12 in the function name 488, registers the user received from the user/modification-side client terminal 12 in the user 490, and registers the condition save name received as a new name from the use/modification-side client terminal 12 in the condition save name 492, generates and sets a search number 496 (gives serial numbers to search conditions from upper left to lower right), and registers the search items, the search signs, and the search conditions received from the use/modification-side client terminal 12 in the search item 498, the search sign 500, and the search condition 502, respectively. Further, the automatic screen generation processing unit 22 registers the start-up initial condition 397 received from the use/modification-side client terminal 12 in the start-up classification 504.

Further, in the data access screen 380 of the list form in the initial state, a list box of values of the DB item name 306 in the order of the arrangement order 304 is generated as the item name 390. If a value exists in the display item name 308, the value of the display item name 308 is displayed preferentially in place of the value of the DB item name 306. In the example shown in FIG. 11, "customer name" is displayed in place of the display item name "customer".

Further, in the case where information of which the acquired display/arrangement-order classification 476="display" exists, the arrangement order of the screen items and the item names to display have been modified. Accordingly, data of the display/hidden 484="display" are extracted, and the arrangement order is generated again using the above-mentioned order 478 and the item name 480. An item of the display/hidden 484="hidden" is removed from the item name 390 also.

Further, in the data access screen 380 of the list form in the initial state, the user can select signs and keywords in order to refine the search conditions variously (Numerical symbol 392). Selectable signs and keywords are =, < >, >, >=, <, <=, LIKE, NOT LIKE, IN, NOT IN, IS NULL, and IS NOT NULL.

In the data access screen 400 of the single sheet form in the initial state, the primary key 314 of the setting storage detail table 300 of the setting storage database 16 is placed in the search condition 402. Differently from the data access screen 380 of the detailed list form in the initial state, one search datum should be specified. Thus, the search condition for the primary key uses the perfect matching sign (=) only. Other items than the primary key are arranged in the order of the arrangement order 304 according to display categories being classified by the group name 310. In the example of FIG. 11, the items in question are displayed by separating into a main area and a subarea. Further, an item for which the linefeed 312 is checked is displayed in a new line. In the example of FIG. 11, the item of commodity classification has the checked linefeed 312. Accordingly the commodity classification is displayed not to the right of the commodity name but in a new line. A display area for the value of the item is generated by using the values of the display width digit 320 and the height 322.

Further, in the case where there is information of which the acquired display/arrangement-order classification 476="display", the arrangement order of the screen items and the item names to display have been modified. Accordingly, data of the display/hidden 484="display" are extracted, and the arrangement order is generated again using the above-mentioned order 478 and the item name 480. An item of the display/hidden 484="hidden" is removed from the item name 390 also.

In the database access screen 380 of the list form in the initial state, when the user sets the search conditions 382 and clicks a search button 399, the use/modification-side client terminal 28 receives a search processing instruction accompanied by the search conditions 382 (S68), and sends the search conditions 382 to the automatic screen generation device 1 (S70).

On receiving this, the automatic screen generation processing unit 22 of the automatic screen generation device 1 executes the SQL statement for the use-side database 18, according to the search conditions 382 received as the additional search conditions to the acquired SQL 288. At this time, in the case where a value is set in the maximum number of detail lines 290 acquired, limitation that the value is the maximum number of acquisitions (for example, in the case of Oracle®, ROWNUM<=the maximum number of detailed lines 290) is added to the SQL statement (S72).

Next, when the search execution result data can be obtained, the automatic screen generation processing unit 22 generates heading item names, which are the values of the DB item name 306, in the order of the arrangement order 304. In the case where a value exists in the display item name 308, the value of the display item name 308 is preferentially displayed in place of the value of the DB item name 306. In the example of FIG. 11, "customer name" is displayed in place of the corresponding display item name.

Further, an item of the acquired update object 316="1" is generated as an editable item. A display area for the value of an item is generated by using the values of the display width digit 320 and the height 322. In the case where there is the height 322="-1" and the linefeed is included in the values of the search execution result data, the display area is generated to have the height corresponding to the number of linefeeds. In the database access screen 380 of the detailed list form in the initial state, if "check box", "radio" or "list" is selected in the acquired classification display 326, a list box is generated in any case in the same way as in the generation according to the search conditions 382. In the database access screen 400 of the single sheet form in the initial state, if "check box", "radio" or "list" is selected in the acquired classification display 326, a check box, a radio button, or a list box is generated correspondingly to the selection in the same way in the generation according to the search conditions 382.

Further, in the database access screen 380 of the detailed list form in the initial state, if "delete" is included in the value of the processing authority 294, a delete button is generated in the search result information generated from the search execution result data. In the single sheet form, if "delete" is included in the values of the processing authority 294, a delete button 442 is generated at the bottom left of the screen.

Further, in the database access screen 380 of the detailed list form in the initial state, if the value of the processing authority is other than blank, a processing execution button 428 is generated at the bottom right of the screen.

Further, in the database access screen 400 of the single sheet form in the initial state, if "update" is included in the value of the processing authority 294, an update button 438 is generated at the bottom right of the screen.

Further, in the database access screen 380 of the detailed list form in the initial state, if the number of records of the search result exceeds the lines per page 292, the number of records displayed in the screen is set to the lines per page 292. The remaining records are not displayed in the screen and are held internally as a data set for each unit of the lines per page 292. And when the automatic screen generation processing unit 22 receives information of click of the next page 411 shown in FIG. 12, screen display for each data set is generated. If the number of the search result records is large and thus a plurality of data sets are generated, the data sets are displayed in the order of generations of the screen displays at the time when the automatic screen generation processing unit 22 receives the click information of the next page 411.

Further, if "update" is included in the value of the processing authority 294, an item for which 1 is set in the update object 316 is generated as an editable item.

Further, if values are set in the transition button name 298 and the transition destination screen 296, a screen transition button (that is a commodity maintenance button 418 in the example of FIG. 12, and transition destination is the commodity master single sheet maintenance) is added.

Further, if information of display/arrangement-order classification 476="display" exists, the arrangement order of the screen items and the item names to display have been modified. Accordingly, data of the display/hidden 484="display" are extracted, and the arrangement order is generated again using the order 478 and the item name 480. An item of the display/hidden 484="hidden" is removed from the item name 390 also. Further, if information of the display/arrangement-order 476="arrangement order" exists, the arrangement of the search execution data is executed by using the information of the order 478, the item name 480 and the ascending/descending order, then search result information of the database access screen is generated (S74) and displayed on the use/modification-side client terminal 28 (S76).

FIG. 12 shows an example of the database access screen 26 in a state after search. Here, the numerical symbol 431 indicates an example of the detailed list form and the numerical symbol 431 indicates an example of the single sheet form.

In the database access screen 431 of the detailed list form in the after-search state, when the user clicks a CSV output button 414, the use/modification-side client terminal 28 receives a CSV output instruction and sends the instruction to the automatic screen generation device 1. On receiving the instruction, the automatic screen generation processing unit 22 of the automatic screen generation device 1 generates a comma-delimited text file from the acquired search execution result data, and displays the generated file on the use/modification-side client terminal 28 by using table form software.

When the user clicks a screen transition button 418 in the database access screen 431 of the detailed list form in the after-search state, the automatic screen generation processing unit 22 executes processing under another function name, delivers, as an argument, the value of the item for which 1 is set as a search condition in the transition argument 330, and executes search to display a database access screen. In the example of FIG. 12, when the data of the order number=J002 is clicked at "commodity maintenance" in the screen transition 418, the automatic screen generation processing unit 22 generates a commodity master single sheet maintenance since "commodity master single sheet maintenance" is set in the transition destination screen 296. Since the DB item name for which 1 is set as a search condition in the transition destination argument 330 is commodity code, the commodity code=ITEM_B is delivered, to perform search processing. As a result, a screen of commodity master single sheet maintenance 433, in which the commodity code=ITEM_B is set, is generated in a searched state.

When the user clicks a screen setting button 432 in the database access screen 431 of the detailed list form in the after-search state, the use/modification-side client terminal 28 sends a screen modification request to the automatic screen generation device (S77). On receiving this, the screen modification setting processing unit 24 of the automatic screen generation device generates an access screen modification setting screen 27, and display the generated screen on the use/modification-side terminal (S78).

FIG. 13 shows an example of the access screen modification setting screen 27. Here, the numerical symbol 464 indicates an example of the detailed list form, and the numerical symbol 466 indicates an example of the single sheet form.

In the access screen modification setting screen 464 of the detailed list form, it is possible to set arrangement order 450 of the search results. A list box is generated for the item names 453 such that the values of the DB item names 306 are used as heading item names being arranged in the order of the arrangement order 304. If a value exists in the display item name 308, the display item name 308 is used preferentially in place of the value of the DB item name 306. As for an ascending/descending order 455, a list box of character strings "ascending order" and "descending order" is generated. When an addition button 451 is clicked, the screen modification setting processing unit 24 generates list boxes of the item name 453 and the ascending/descending order 455, and this makes it possible to define arrangement order of a plurality of items. In an area of screen items 452, display items 456 are separated from hidden items 454. Items selected as the hidden items 454 are not generated in both search condition and search result of the database access screen. Switching between display items and hidden items is performed by right and left arrow buttons 458, and change of arrangement order of display items 456 is performed by up and down arrow buttons 460.

When the user clicks a determination button 462, the use/modification-side client terminal 28 receives the function name, the user, the arrangement order items, the arrangement ascending/descending order, the display items, the display item order, through the access screen modification setting screen 27, and the hidden items, and sends the received information to the automatic screen generation device 1 (S81).

On receiving this, the screen modification setting processing unit 24 of the automatic screen generation device 1 registers the received information in the modification setting storage table 470 of the modification setting storage database 17. FIG. 14 shows structure of the modification setting database and an example of sample data. In detail, the received function name is set in the function name 472, the received user is set in the user 474, a character string "arrangement order" is set in the display/arrangement-order classification 476 for the received arrangement order information, a character string "display" is set in the display/arrangement-order classification 476 for the received display information, arrangement order is set in the order 478 for the received arrangement order information, display item order is set in the order 478 for the received display information, arrangement order item is set in the item name 480 for the received arrangement order information, display/hidden item name is set in the item name 480 for the received display information, the received arrangement order of ascending order or descending order is set in the ascending/descending order 482, and a character string "display" is set in the display/hidden 484 for the display item, a character string "hidden" is set in the display/hidden 484 for the hidden item (S82).

Next, after completion of registration in the modification setting storage table 470, the screen modification setting processing unit 24 calls the automatic screen generation processing unit 22. On receiving the call, the automatic screen generation processing unit 22 accesses the modification setting storage table 470 (See FIG. 14) of the modification setting storage database 17, to acquire the display/arrangement-order classification 476, the order 478, the item name 480, the ascending/descending order 482, and the display/hidden 484 by using the function name and the user as keys.

If information of the display/arrangement-order 476="display" exists, then the arrangement order of the screen items and the item names to display have been modified. Accordingly, data of the display/hidden 484="display" are extracted, and the arrangement order is generated again using the order 487 and the item name 480. An item of the display/hidden 484="hidden" is removed from the item name 390 also. Further, if information of the display/arrangement-order classification 476="arrangement order" exists, the arrangement of the search execution data is reordered by using the information of the order 478, the item name 480, and the ascending/descending order, to generate a database access screen 26 in the after-search state (S84). This screen information is sent to the use/modification-side client terminal 28 (S84), to display the after-search-state database access screen 26 on the use/modification-side client terminal 28 (S86).

FIG. 15 shows an example of the database access screen 26 in the after-search state. Here, the numerical symbol 514 indicates an example of the detailed list form and the numerical symbol 516 indicates an example of the list form.

When the user clicks a delete button 416 in the database access screen 431 of the detailed list form in the after-search state, the target line is deleted from the search result area. When the processing execution button 428 is clicked in this state, the use/modification-side client terminal 28 receives maintenance request information for the use-side database 18 (S88), and sends the maintenance request information to the automatic screen generation device 1 (S90).

On receiving the information, the automatic screen generation processing unit 22 of the automatic screen generation device 1 deletes the record from the output table 286 by using the item of the primary key 314 among the values in the received maintenance request information as a key (S92). Then, the automatic screen generation processing unit 22 acquires a deletion result (normal deletion or failure due to restriction or the like) from the use-side database 18, and sends the deletion result to the use/modification-side client terminal 28 (S94). And the automatic screen generation processing unit 22 displays the database access screen 514 of the detailed list form in the after-modification state on the use/modification-side client terminal 28 (S96) as output result information of the use-side database 18.

Further, when the user clicks the delete button 442 in the database access screen 433 of the single sheet form in the after-search state, the use/modification-side client terminal 28 receives maintenance information for the use-side database 18 (S88), and sends this maintenance request information to the automatic screen generation device 1 (S90).

On receiving the information, the automatic screen generation processing unit 22 of the automatic screen generation device 1 deletes data from the output table 286 by using the item of the primary key 314 among the values in the received maintenance information as a key (S92). Then, the automatic screen generation processing unit 22 acquires a deletion result (normal deletion or failure due to restriction or the like) from the use-side database 18, and sends the deletion result to the use/modification-side client terminal 28 (S94). And the automatic screen generation processing unit 22 displays, as output result information of the use-side database 18, the database access screen 516 of the single sheet form in the after-modification state on the use/modification-side client terminal 28 as output result information of the use-side database 18 (S96).

Further, in the database access screen 431 of the detailed list form in the after-search state, when the user edits the value of an updatable item and clicks the processing execution button 428, or when the user clicks the lines addition button 395 in the database access screen 431 to add a new line in the search result area and edits the value of an updatable item and clicks the processing execution button 428, then the use/modification-side client terminal 28 receives maintenance information for the use-side database 18 (S88), and sends this maintenance request information to the automatic screen generation device 1 (S90).

On receiving the information, as checks at the time of registration and update, the automatic screen generation processing unit 22 of the automatic screen generation device 1 checks whether there is a violation of the display/input format 318 or the display width digit 320, and checks whether a value is set in each item for which 1 is set in the compulsory 324, and further checks whether a value is set in the range of the input check pattern 328. If an error is detected, the automatic screen generation processing unit 22 displays error information on the use/modification-side client terminal 28, and ends without performing registration and update processing. On the other hand, if an error is not detected, the automatic screen generation processing unit 22 registers and updates the record in the output table 286 by using the item of the primary key 314 among the values in the received maintenance information as a key. Then, the automatic screen generation processing unit 22 acquires a registration and update result (normal update or failure due to restriction or the like) from the use-side database 18, and sends the registration and update result to the use/modification-side terminal 28 (S94). And the automatic screen generation processing unit 22 displays the database access screen 514 of the detailed list form in the after-modification state on the use/modification-side client terminal 28 as output result information of the use-side database 18 (S96).

Further, in the database access screen 433 of the single sheet format in the after-search state, when the user edits a value of an updatable item and clicks the update button 438, or when the user opens the screen from the menu and edits a value of an updatable item as new data and clicks a registration button 440, the use/modification-side client terminal 28 receives maintenance information for the use-side database 18 (S88), and sends this maintenance request information to the automatic screen generation device 1 (S90). By the way, the database access screen 433 of the single sheet format of FIG. 12 is shown as an example in which registration cannot be performed because the processing authority 294 does not include the character string "registration" and the user does not have the registration authority.

On receiving the information, as checks at the time of registration and update, the automatic screen generation processing unit 22 of the automatic screen generation device 1 checks whether there is a violation of the display/input format 318 or the display width digit 320, and checks whether a value is set in each item for which 1 is set in the compulsory 324, and further checks whether a value is set in the range of the input check pattern 328. If an error is detected, the automatic screen generation processing unit 22 displays error information on the use/modification-side client terminal 28, and ends without performing registration and update processing. On the other hand, if an error is not detected, the automatic screen generation processing unit 22 registers and updates the record in the output table 286 by using the item of the primary key 314 among the values in the received maintenance information as a key. Then, the automatic screen generation processing unit 22 acquires a registration and update result (normal update or failure due to restriction or the like) from the use-side database 18, and sends the registration and update result to the use/modification-side terminal 28 (S94). And the automatic screen generation processing unit 22 displays the database access screen 514 of the detailed list form in the after-modification state on the use/modification-side client terminal 28 as output result information of the use-side database 18 (S96).

Hereinabove, an embodiment of the present invention has been described. In the following, some aspects of the embodiment of the present invention will be described.

(1) In the automatic screen generation device 1 of the present embodiment, when the automatic screen generation setting processing unit 14 receives setting of at least one table and field, to and from which information on the use-side database 18 is desired to be inputted and outputted as items of the database access screen 26, from the setting-side client terminal 12 through the automatic screen generation setting screen 10, then the automatic screen generation setting processing unit 14 receives setting of the database access screen 26 of the single sheet form or the detailed list form depending on the utilization form. Then, the automatic screen generation setting processing unit 14 saves the function name determined in the setting-side client terminal 12 as a key in the setting storage database 16, with the information of the above-mentioned setting as associated information. According to an instruction from the use/modification-side client terminal 28, the automatic screen generation processing unit 22 reads the associated information and program for generating a data access screen 26 depending on the utilization form, to generate the database access screen 26 automatically.

(2) In the automatic screen generation device 1 of the present embodiment, the screen modification setting processing unit 24 receives setting of layout change and change of arrangement order from the use/modification-side client terminal 28 through the automatically-generated database access screen 26, and in addition receives setting of data search conditions from the use/modification-side client terminal 28 through the screen modification setting processing screen 27. And the screen modification setting processing unit 24 saves these setting contents in the modification setting storage database 17. The automatic screen generation processing unit 22 reads the setting contents for each user from the modification setting storage database 17, and generates automatically the database access screen 26, which is different for each user.

(3) The automatic screen generation device 1 of the present embodiment can set various functions that are required usually in the database access screen. That is to say, the automatic screen generation processing unit 22 generates the database access screen 26 automatically, according to setting information, which is set by the setting person through the automatic screen setting screen 10 and is saved in the setting storage database 16 by the automatic screen generation setting processing unit 14. The following functions are provided as functions of the database access screen 26 thus generated.

1. Setting of screen pattern (Single sheet form/Detailed list form) (Utilization form 284 in FIG. 9);
2. Setting of field information and layout position of the result area (Arrangement order 304, DB item name 306, Group name 310, and Linefeed 312 in FIG. 9);
3. Setting of error check (Compulsory 324, and Input check pattern 328 in FIG. 9);

4. Setting of display form of code information in list box, check box, or radio button (Classification display 326 in FIG. 9);
5. Setting of the number of search fields (Number of search fields 299 in FIG. 9);
6. Setting of the maximum number for search for each screen program (Maximum number of detail lines 290 in FIG. 9);
7. Setting of the number of outputted detailed lines displayed in a page (Lines per page in FIG. 9);
8. Setting of CSV data output that can be used for table form software;
9. Setting of display width, input width, and line height for each item (Display/input format 318, Display width digit 320, and Height 322 in FIG. 9);
10. Setting of security of each user (setting of permission/non-permission of operation) (Function name 334, and Using group 336 in FIG. 9);
11. Setting of permission/non-permission of processing of registration, update, and delete in database input and output for each screen program (Processing authority 294 in FIG. 9); and
12. Setting of transition from screen to screen with values being passed between them (Transition destination screen 296, Transition button name 298, and Transition destination argument 330 in FIG. 9).

Further, the automatic screen generation setting processing unit 22 generates the database access screen 26 automatically, according to setting information, which is set by the user through the access screen modification setting screen 27 and saved in the modification setting storage database 17 by the screen modification setting processing unit 24. The following functions are provided as functions of the database access screen 26 thus generated.
13. Setting that allows save of search condition for refining of database search for each user, and allows later call with the same condition (a plurality of saves are allowed) (User 490, Condition save name 492, Search number 496, Search item 498, Search sign 500, Search condition 502, and Start-up classification 504 in FIG. 14); 14. Setting of change of arrangement order (applicable to both rows and columns) of items to display for each user (User 474, Display/arrangement-order classification 476, Order 478, Item name 480, and Ascending/Descending order 482 in FIG. 14); and
15. Setting for a screen field to be displayed/hidden for each user (User 474, Display/arrangement-order classification 476, Order 478, Item name 480, and Display/hidden 484 in FIG. 14).

INDUSTRIAL APPLICABILITY

The invention described hereinabove can be applied to an automatic screen generation device, an automatic screen generation program, and a method of automatic generation of screen.

REFERENCE SIGNS LIST

1: automatic screen generation device; 10: automatic screen generation setting screen; 12: setting-side client terminal; 14: automatic screen generation setting processing unit; 16: setting storage database; 17: modification setting storage database; 18: use-side database; 20: utilization-form-specific screen program storage unit; 22: automatic screen generation processing unit; 24: screen modification setting processing unit; 26: database access screen; 27: access screen modification setting screen; and 28: use/modification-side client terminal.

The invention claimed is:

1. An automatic screen generation device for generating use-side database access screens automatically, the automatic screen generation device comprising:
   a use-side database comprising a plurality of tables, each table storing a plurality of use-side records, each use-side record having a plurality of fields;
   a setting storage database comprising a setting save record including at least one field of the use-side records, attribute information associated with the at least one field, a utilization form, and identification information and primary key information of the table registering the use-side records;
   a utilization-form-specific screen program data store storing programs configured to automatically generate the access screens corresponding respectively to utilization forms including a single sheet form and a detailed list form; and
   a hardware processor and a memory, the memory storing executable instructions configured to function as:
      an automatic screen generation program module configured to read, from the utilization-form-specific screen program data store, a program corresponding to a utilization form included in a setting save record read from the setting storage database according to an instruction from a user, and to generate an access screen corresponding to the utilization form in connection with the read program; and
      a use-side database update program module configured to update the use-side database through each access screen generated by the automatic screen generation program module;
   wherein the automatic screen generation program module is further configured to read the setting save record from the setting storage database according to the instruction from the user, identify the table having the identification information included in the setting save record from among the tables stored in the use-side database, and cause the fields of the use-side records that are included in the setting save record stored in the identified table to be displayed according to the associated attribute information that is included in the setting save record via the access screen corresponding to the utilization form; and
   wherein the use-side database update program module is further configured to selectively register, update, and delete a use-side record that is specified by the primary key information included in the setting save record in the table specified by the identification information included in the setting save record from among the tables stored in the use-side database, according to an operation received from the user through the access screen.

2. The automatic screen generation device of claim 1, further comprising:
   a modification setting storage database comprising a modification setting save record including at least one field of the setting save record stored in the setting storage database and attribute information modifying the field; and
   wherein the automatic screen generation program module is further configured to read the setting save record from the setting storage database according to the instruction from the user, read the modification setting save record from the modification setting storage database, identify the table having the identification information included in the setting save record from among the tables stored in the use-side database, and generate for display fields included in the setting save record and the modification setting save record of the use-side records stored in the identified table according to the attribute information that is included in the setting save record and the modification setting save record, via the access screen corresponding to the utilization form.

3. The automatic screen generation device of claim 1, further comprising:
an automatic screen setting program module configured to (a) acquire the at least one field of the use-side records, the attribute information of the field, the utilization form, and the identification information and the primary key information of the table registering the use-side records, and (b) store, in the setting storage database, a setting save record that includes the acquired field, the attribute information of the field, the utilization form, and the acquired identification information and the primary key information of the table.

4. The automatic screen generation device of claim 2, further comprising:
a screen modification setting program module configured to (a) acquire the at least one field as a constituent of the setting save record of the setting storage database and the attribute information modifying the field, and (b) store, in the modification setting storage database, a modification setting save record that includes the acquired field and the attribute information modifying the record.

5. A non-transitory computer readable storage medium tangibly storing an automatic screen generation program for making a computer generate an access screen to a use-side database, wherein the program, when executed by the computer, causes the computer to perform functionality comprising:
storing a use-side database comprising a plurality of tables, each table storing a plurality of use-side records, each use-side record having a plurality of fields;
storing a setting storage database comprising a setting save record including at least one field of the use-side records, attribute information associated with the at least one field, a utilization form, and identification information and primary key information of the table registering the use-side records;
having a utilization-form-specific screen program data store that stores utilization-form-specific programs configured to automatically generate the access screens corresponding respectively to utilization forms including a single sheet form and a detailed list form;
reading, from the utilization-form-specific screen program data store, a utilization-form-specific program corresponding to a utilization form included in a setting save record read from the setting storage database according to an instruction from a user, and generating an access screen corresponding to the utilization form in connection with the read utilization-form-specific program;
updating the use-side database through each access screen generated;
reading the setting save record from the setting storage database according to the instruction from the user, identifying the table having the identification information included in the setting save record from among the tables stored in the use-side database, and causing the fields of the use-side records that are included in the setting save record stored in the identified table to be displayed according to the associated attribute information that is included in the setting save record via the access screen corresponding to the utilization form; and
registering, updating, or deleting a use-side record that is specified by the primary key information included in the setting save record in the table specified by the identification information included in the setting save record from among the tables stored in the use-side database, according to an operation received from the user through the access screen.

6. An automatic screen generation method for generating use-side database access screens automatically by using an automatic screen generation device, wherein:
the automatic screen generation device comprises:
a use-side database comprising a plurality of tables, each table storing a plurality of use-side records each use-side record having a plurality of fields;
a setting storage database comprising a setting save record including at least one field of the use-side records, attribute information associated with the at least one field, a utilization form, and identification information and primary key information of the table registering the use-side records; and
a utilization-form-specific screen program data store storing programs configured to automatically generate the access screens corresponding respectively to utilization forms including a single sheet form and a detailed list form; and
the method comprising:
reading a setting save record from the setting storage database according to an instruction from a user;
reading a program corresponding to the utilization form included in the setting save record from the utilization-form-specific screen program data store;
identifying a table having the identification information included in the setting save record from among the tables stored in the use-side database;
causing the fields of the use-side records that are included in the setting save record stored in the identified table to be displayed according to the associated attribute information that is included in the setting save record via an access screen corresponding to the utilization form by the read program;
receiving an operation from the user through the access screen; and
registering, updating or deleting a use-side record that is specified by the primary key information included in the setting save record in the table specified by the identification information included in the setting save record from among the tables stored in the use-side database.

7. The non-transitory computer readable storage medium of claim 5, wherein the program, when executed by the computer, causes the computer to perform functionality further comprising:
storing a modification setting storage database comprising a modification setting save record including at least one field of the setting save record stored in the setting storage database and attribute information modifying the field; and
reading the setting save record from the setting storage database according to the instruction from the user, reading the modification setting save record from the modification setting storage database, identifying the table having the identification information included in the setting save record from among the tables stored in the use-side database, and generating for display fields included in the setting save record and the modification setting save record of the use-side records stored in the identified table according to the attribute information that is included in the setting save record and the modification setting save record, via the access screen corresponding to the utilization form.

8. The non-transitory computer readable storage medium of claim 5, wherein the program, when executed by the computer, causes the computer to perform functionality further comprising:
   acquiring the at least one field of the use-side records, the attribute information of the field, the utilization form, and the identification information and the primary key information of the table registering the use-side records; and
   storing, in the setting storage database, a setting save record that includes the acquired field, the attribute information of the field, the utilization form, and the acquired identification information and the primary key information of the table.

9. The non-transitory computer readable storage medium of claim 7, wherein the program, when executed by the computer, causes the computer to perform functionality further comprising:
   acquiring the at least one field as a constituent of the setting save record of the setting storage database and the attribute information modifying the field; and
   storing, in the modification setting storage database, a modification setting save record that includes the acquired field and the attribute information modifying the record.

10. The method of claim 6, further comprising:
    storing a modification setting storage database comprising a modification setting save record including at least one field of the setting save record stored in the setting storage database and attribute information modifying the field; and
    reading the setting save record from the setting storage database according to the instruction from the user, reading the modification setting save record from the modification setting storage database, identifying the table having the identification information included in the setting save record from among the tables stored in the use-side database, and generating for display fields included in the setting save record and the modification setting save record of the use-side records stored in the identified table according to the attribute information that is included in the setting save record and the modification setting save record, via the access screen corresponding to the utilization form.

11. The method of claim 6, further comprising:
    acquiring the at least one field of the use-side records, the attribute information of the field, the utilization form, and the identification information and the primary key information of the table registering the use-side records; and
    storing, in the setting storage database, a setting save record that includes the acquired field, the attribute information of the field, the utilization form, and the acquired identification information and the primary key information of the table.

12. The method of claim 10, further comprising:
    acquiring the at least one field as a constituent of the setting save record of the setting storage database and the attribute information modifying the field; and
    storing, in the modification setting storage database, a modification setting save record that includes the acquired field and the attribute information modifying the record.

* * * * *